Figure 1:
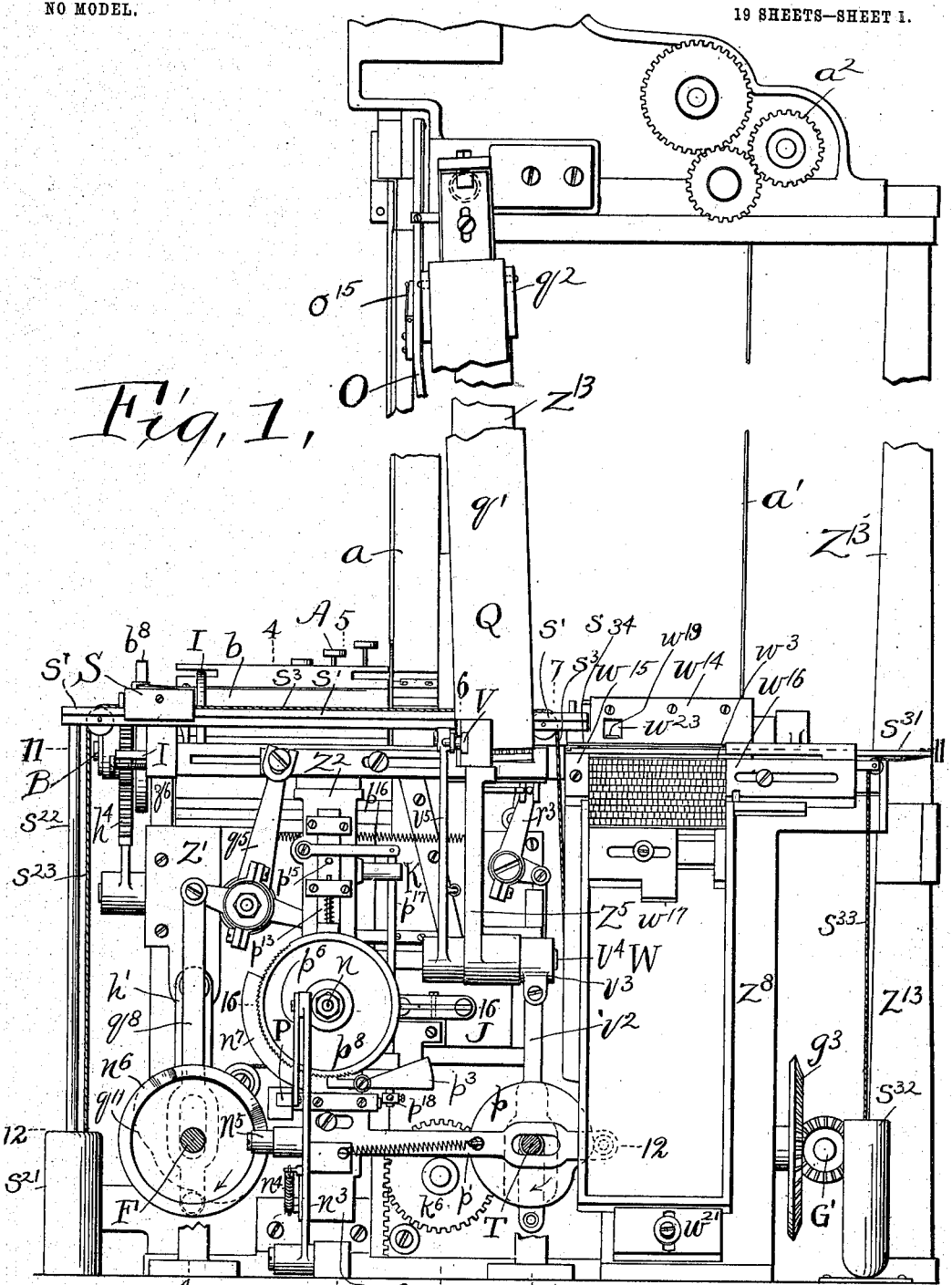

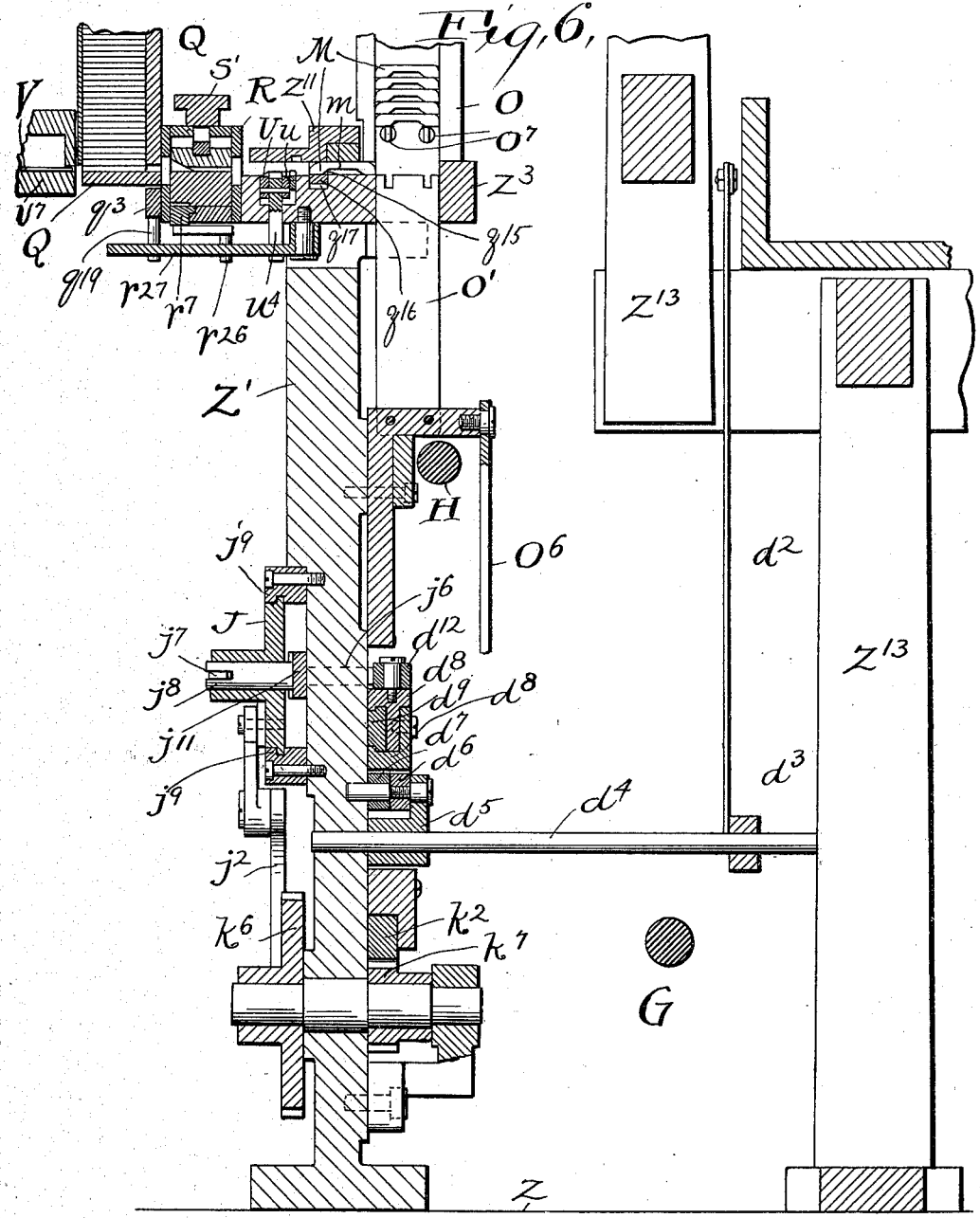

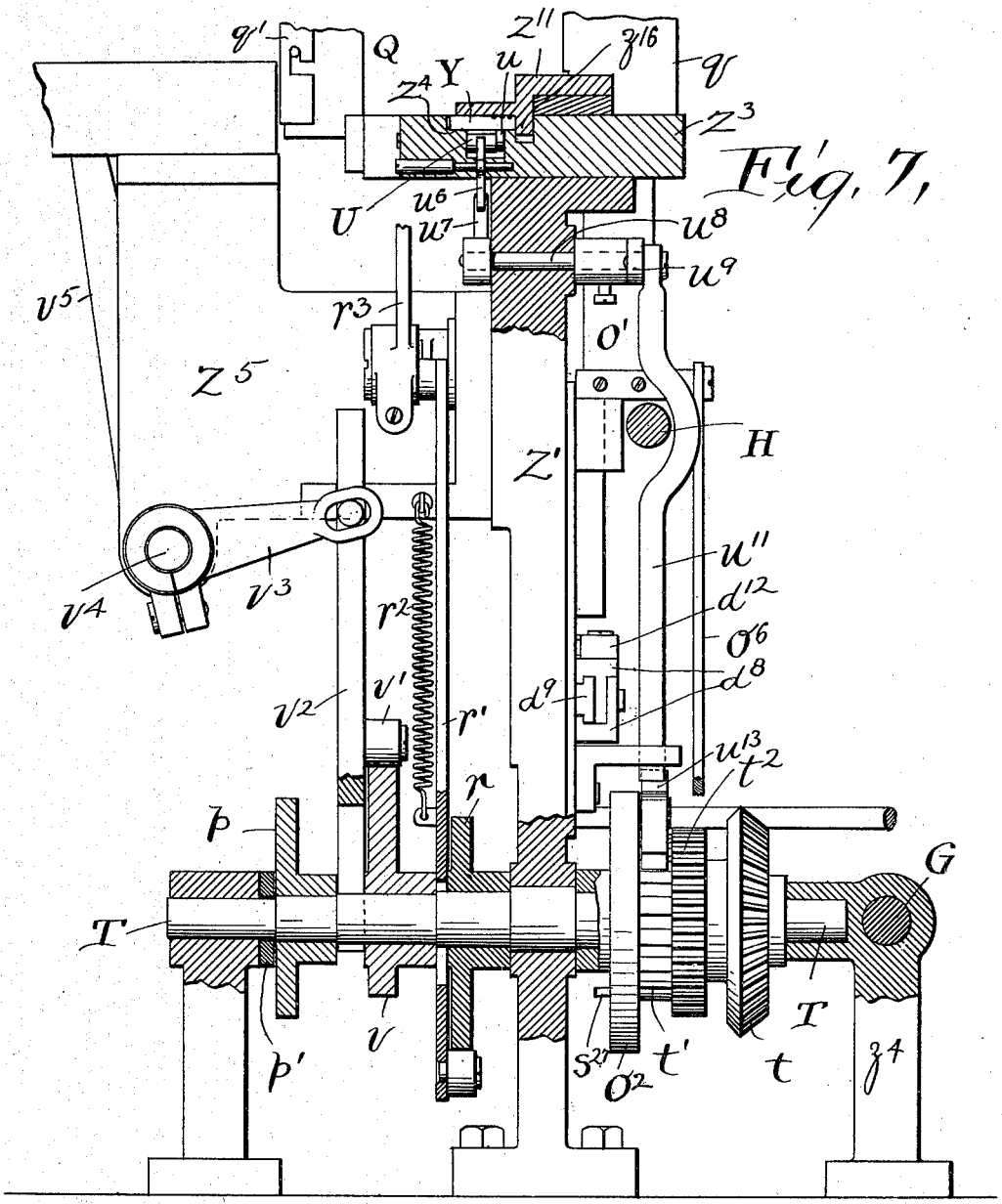

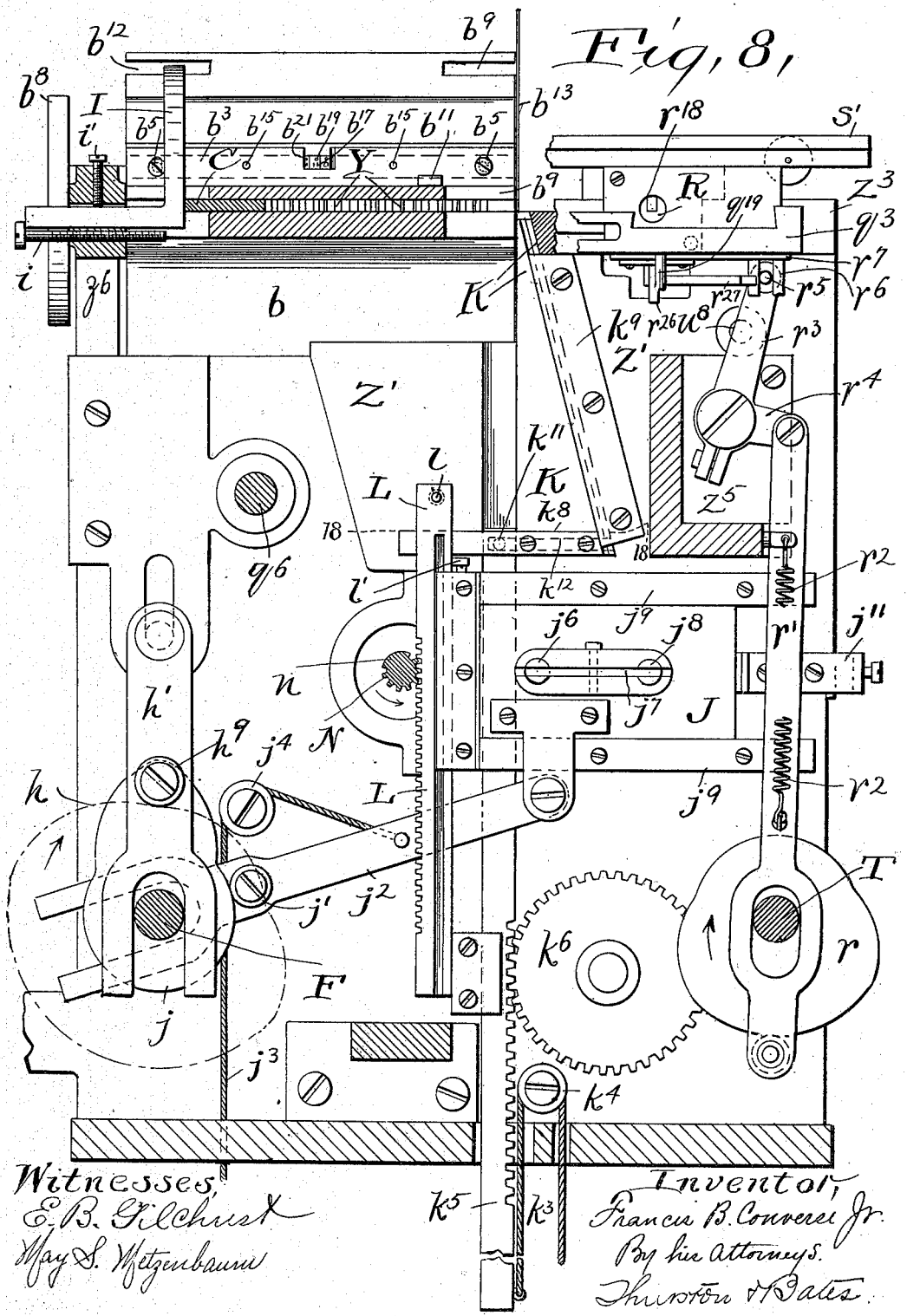

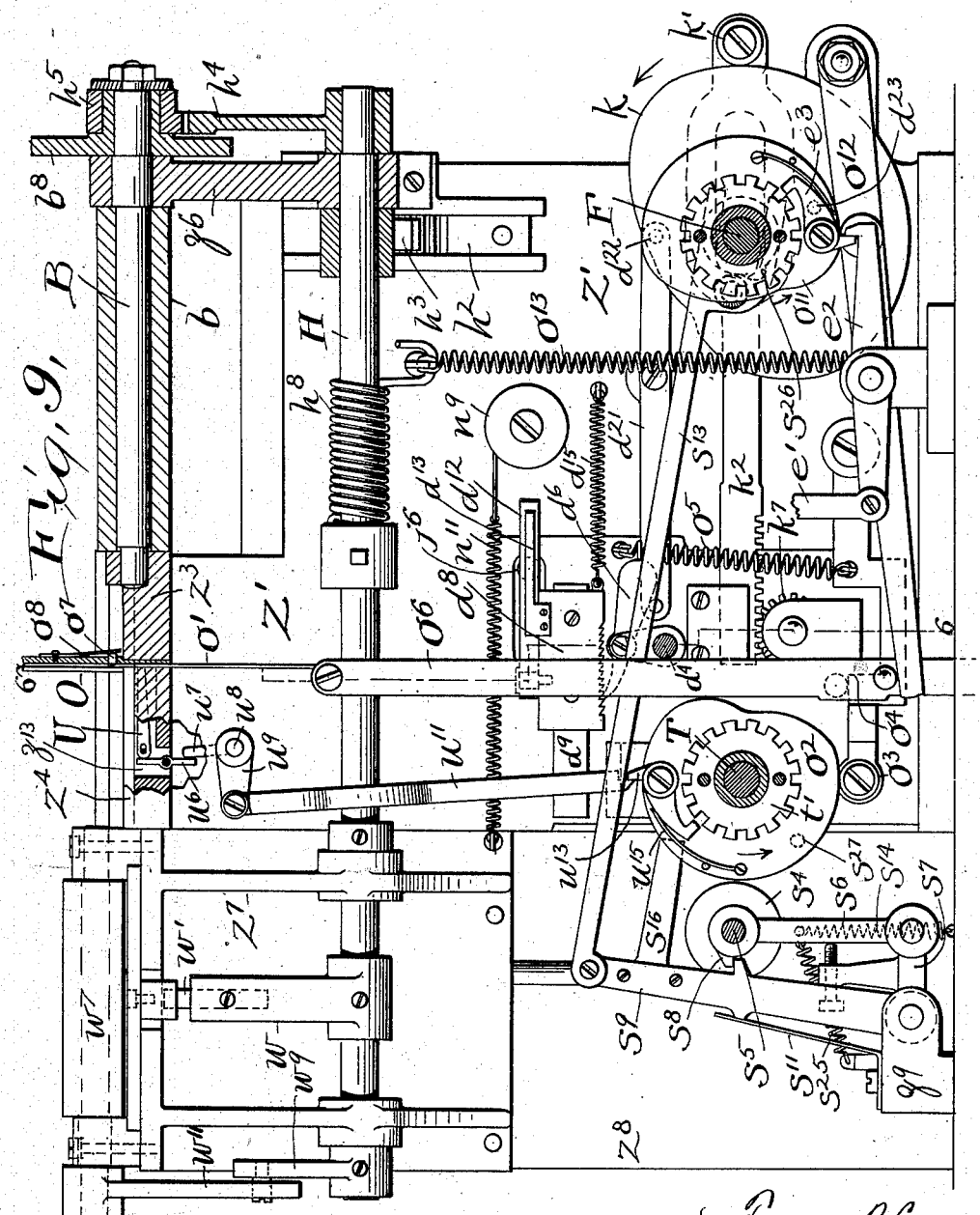

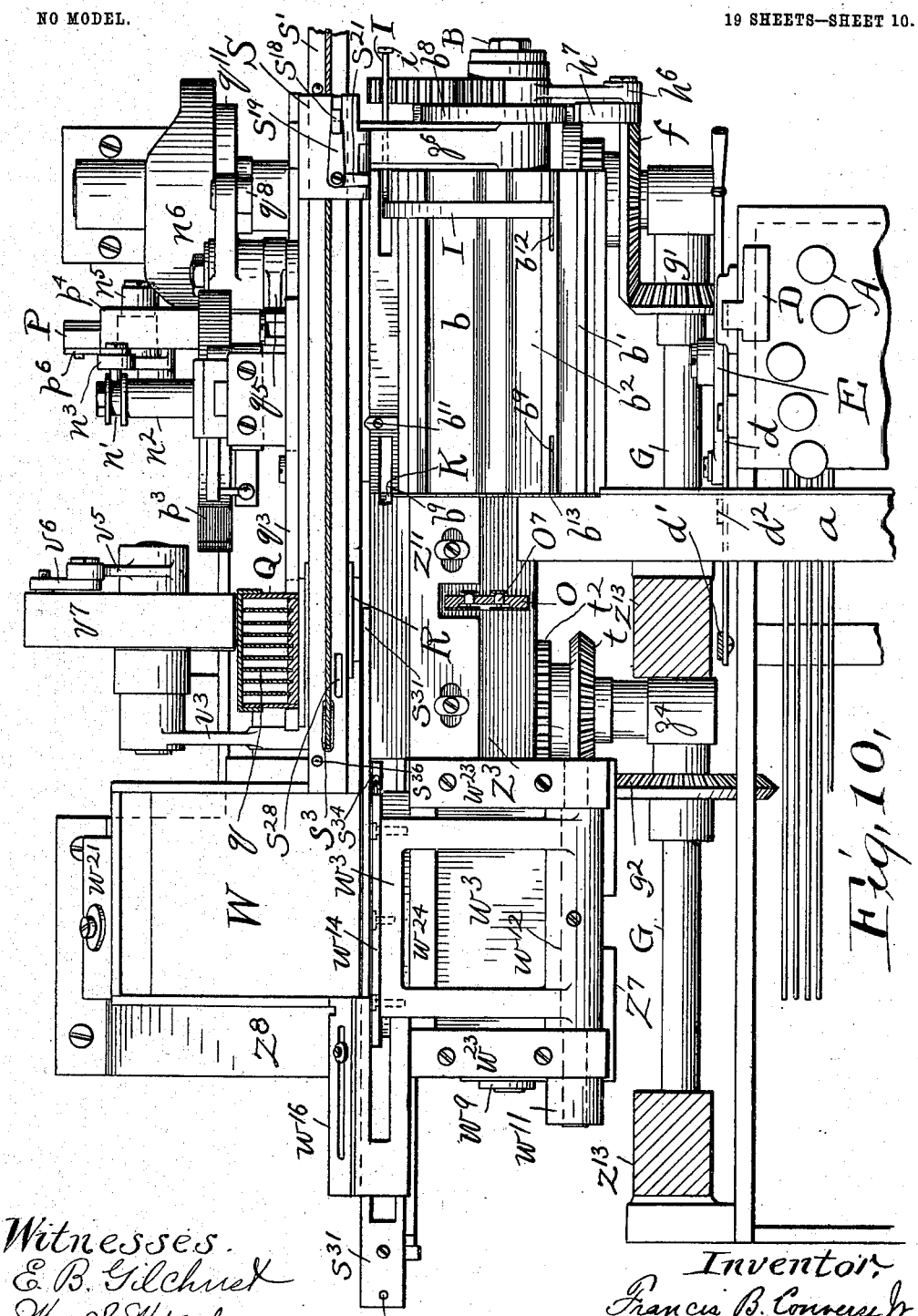

No. 738,741. PATENTED SEPT. 8, 1903.
F. B. CONVERSE, Jr.
JUSTIFYING MECHANISM.
APPLICATION FILED AUG. 27, 1901.
NO MODEL. 19 SHEETS—SHEET 11.
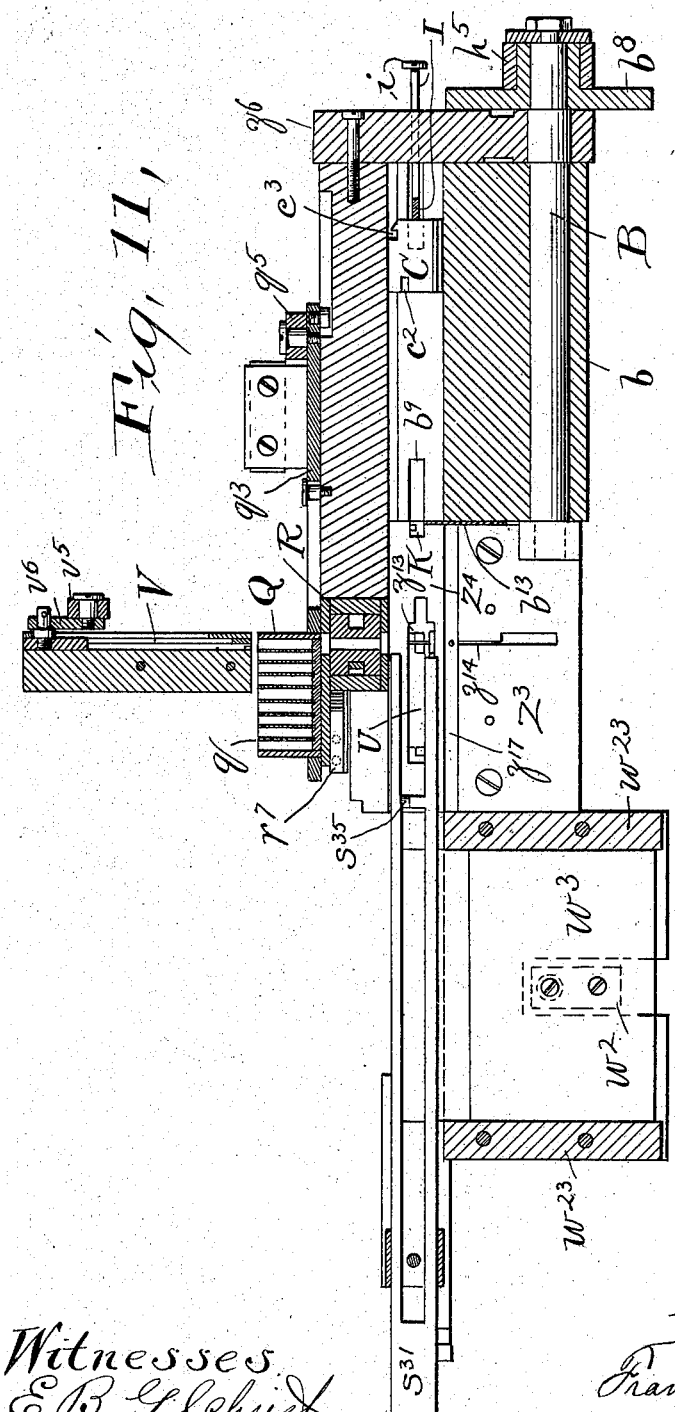
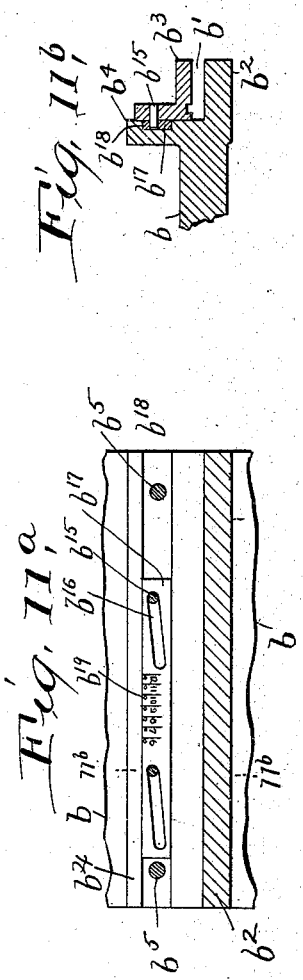

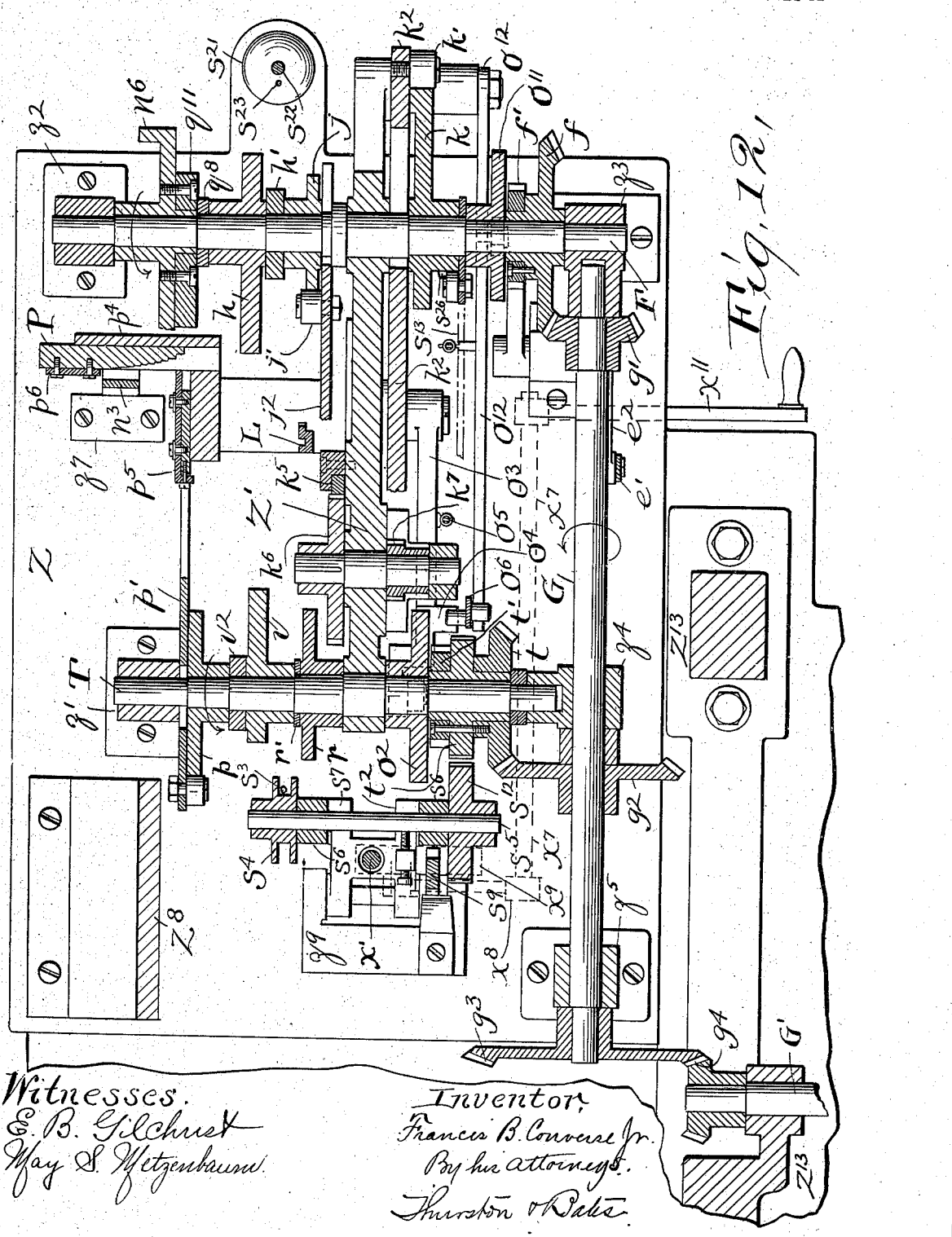

No. 738,741. PATENTED SEPT. 8, 1903.
F. B. CONVERSE, Jr.
JUSTIFYING MECHANISM.
APPLICATION FILED AUG. 27, 1901.
NO MODEL. 19 SHEETS—SHEET 13.

Witnesses,
E. B. Gilchrist
May S. Metzenbaum

Inventor,
Francis B. Converse Jr.
By his Attorneys,
Thurston & Bates

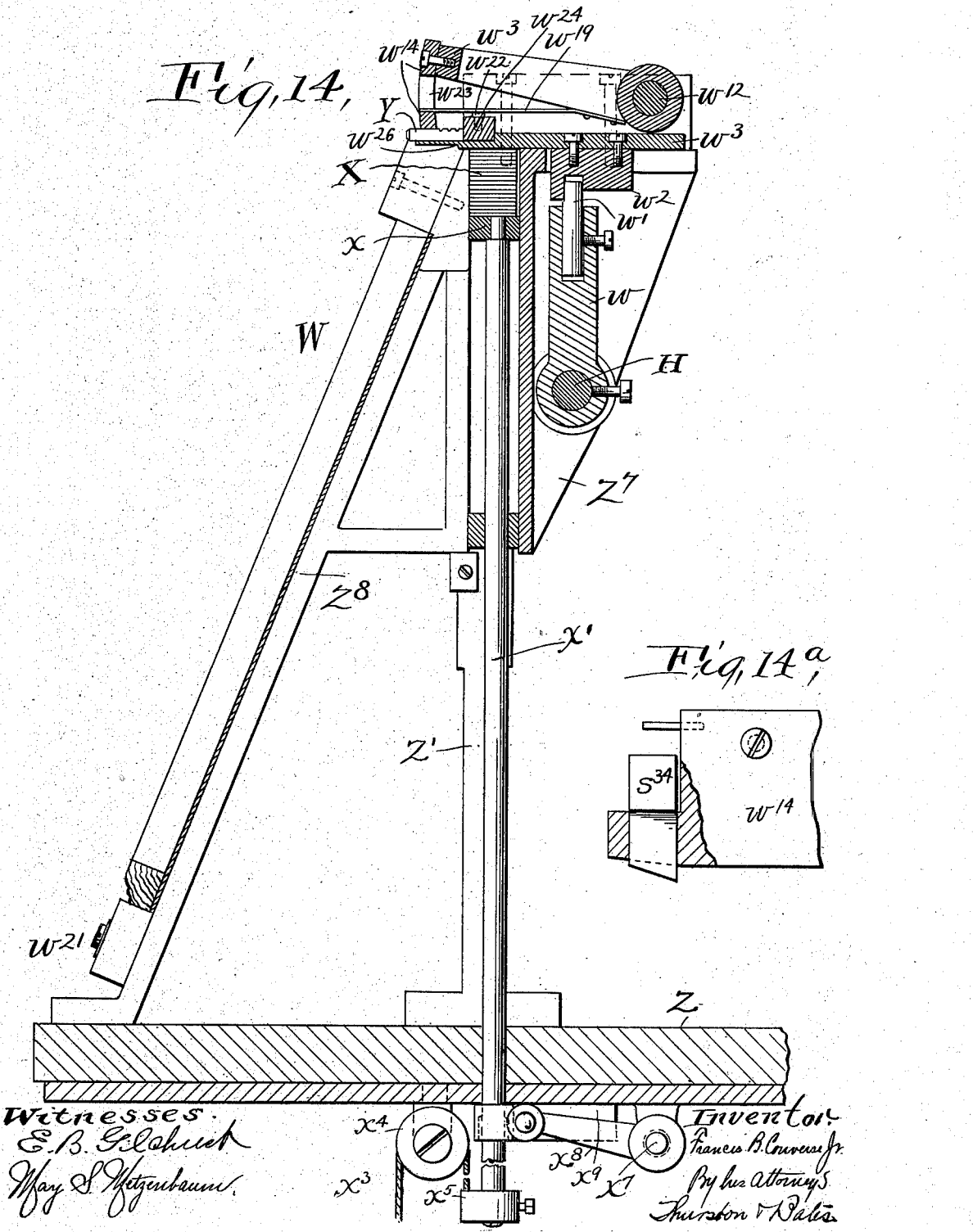

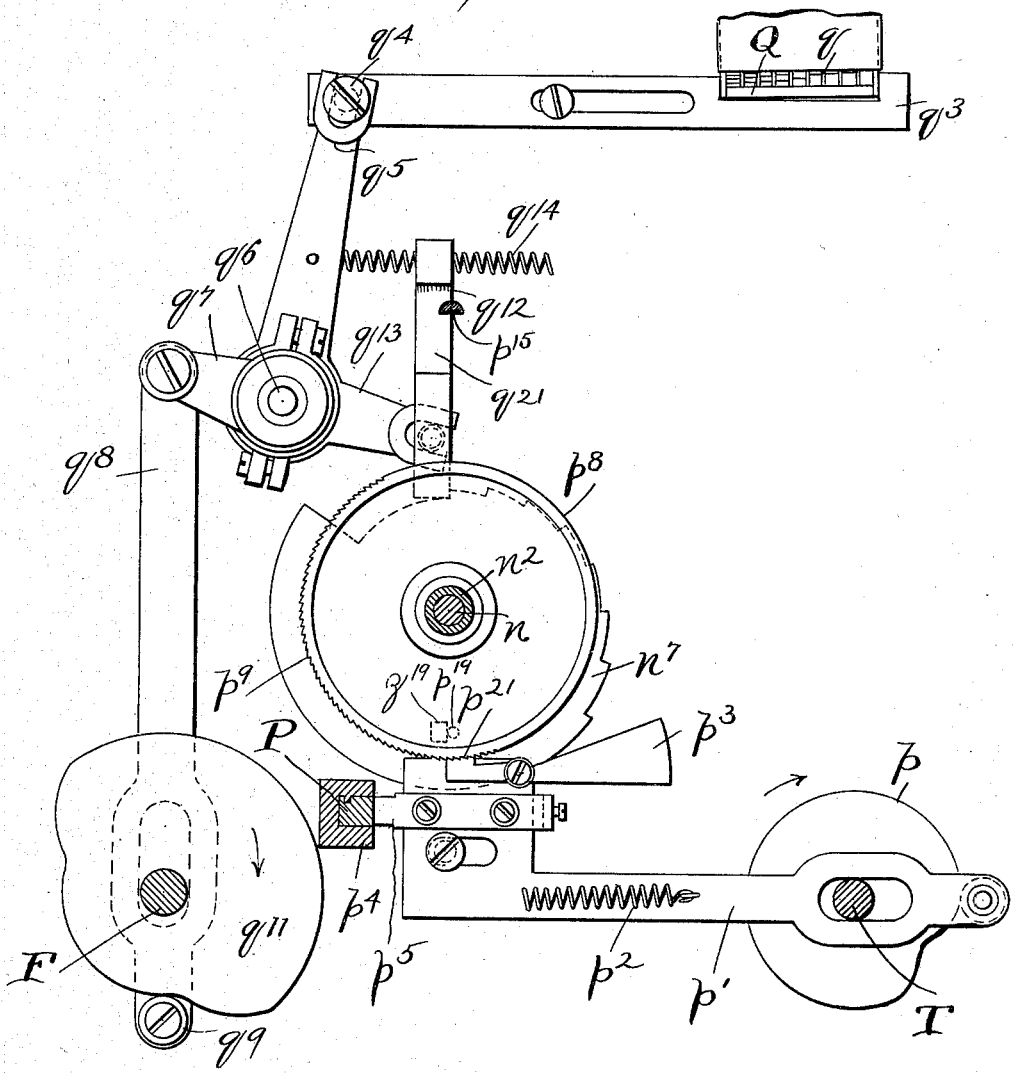

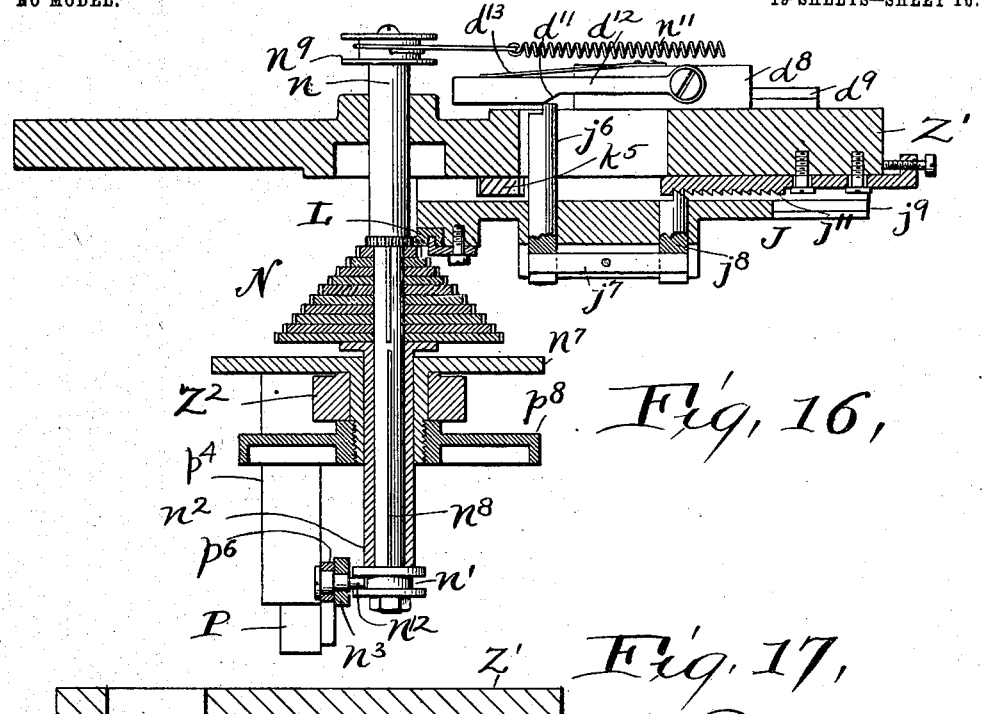
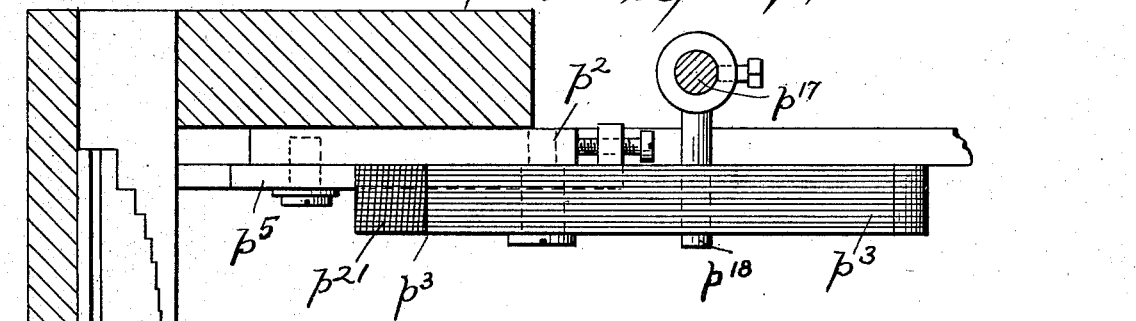
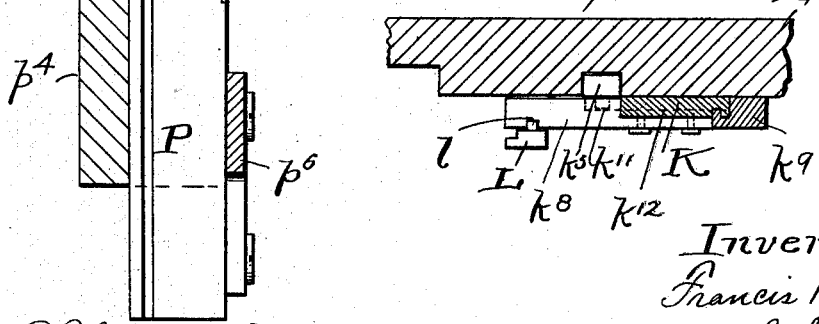

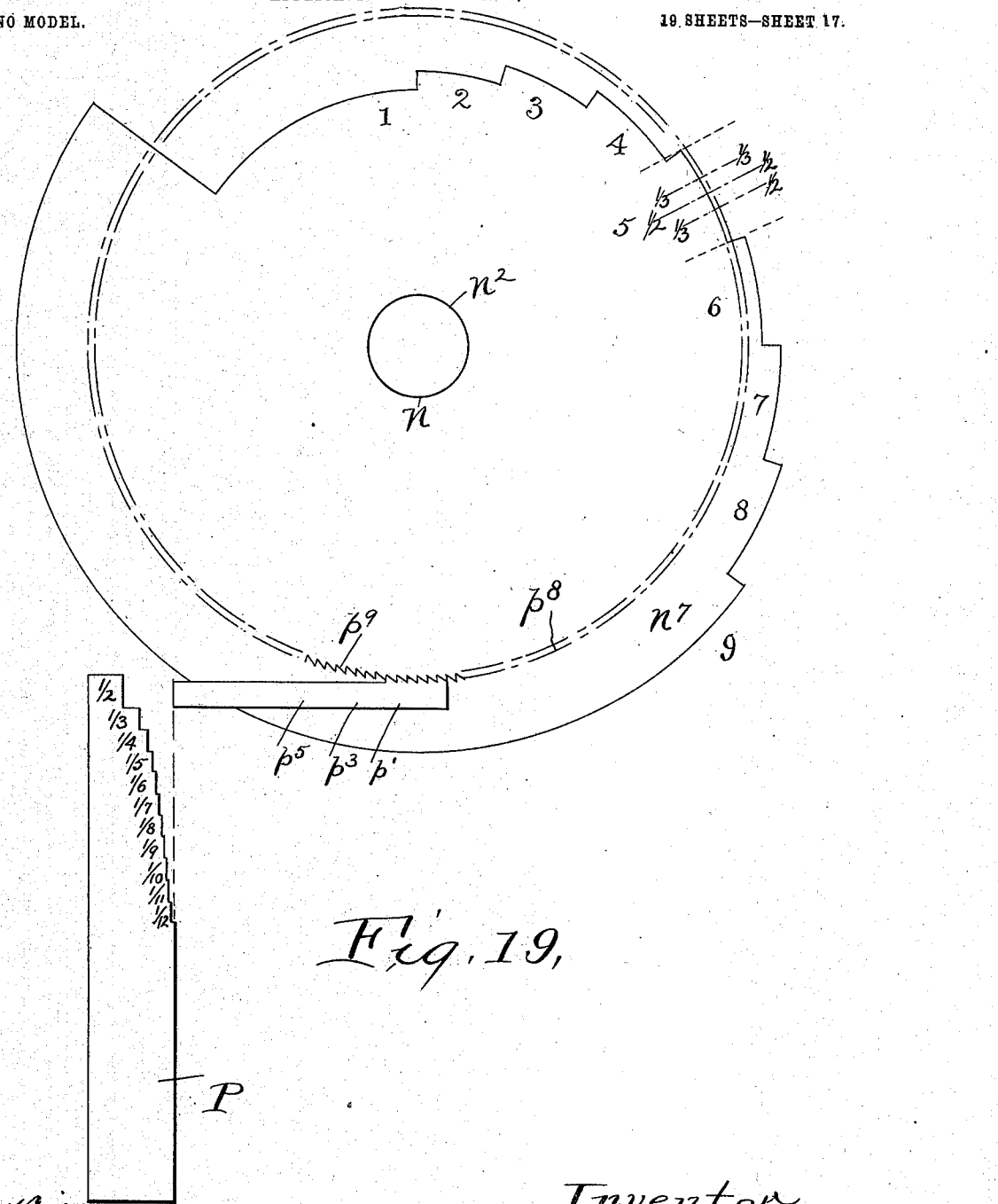

No. 738,741. PATENTED SEPT. 8, 1903.
F. B. CONVERSE, Jr.
JUSTIFYING MECHANISM.
APPLICATION FILED AUG. 27, 1901.
NO MODEL. 19 SHEETS—SHEET 18.
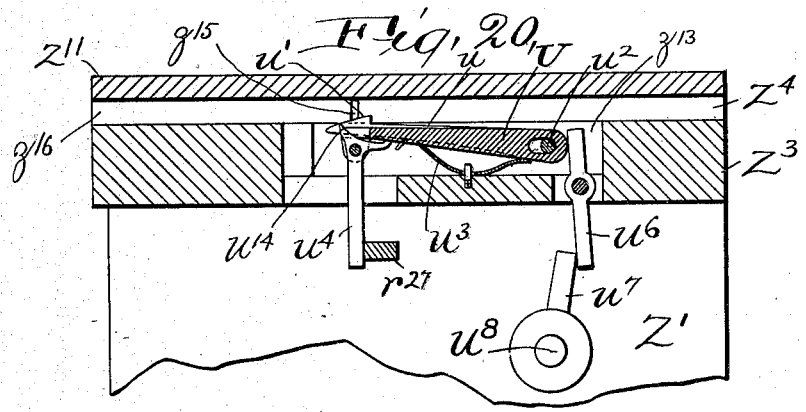
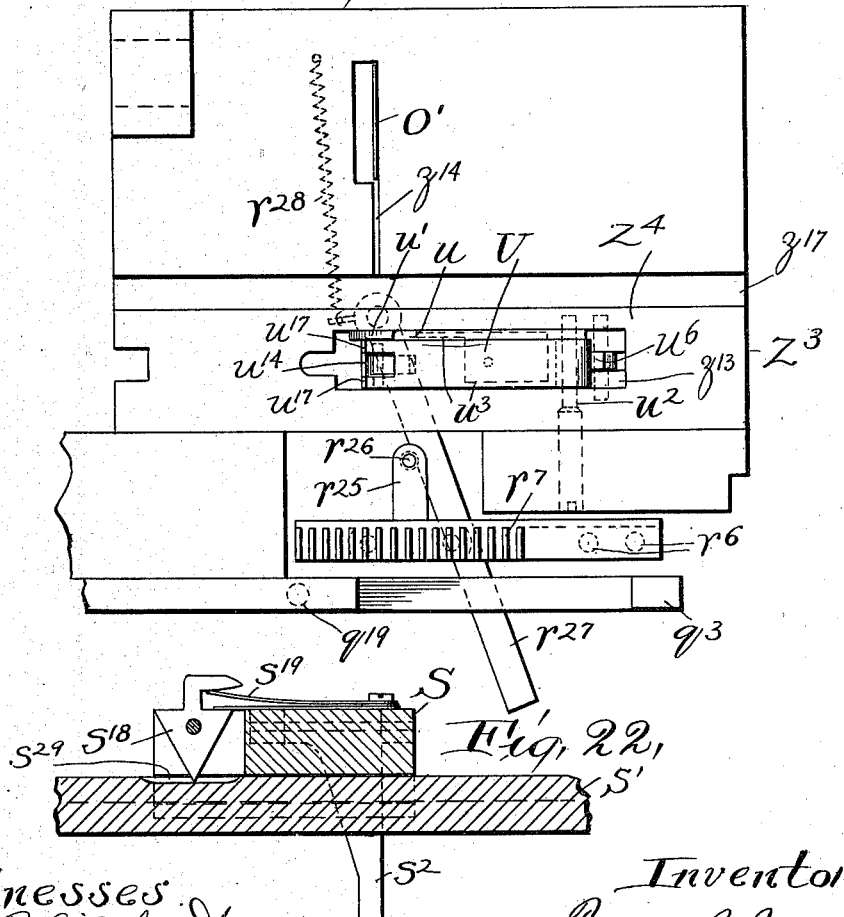
Witnesses
E. B. Gilchrist
May S. Metzenbaum
Inventor,
Francis B. Converse Jr
By his Attorneys
Thurston & Bates No. 738,741. PATENTED SEPT. 8, 1903.
F. B. CONVERSE, Jr.
JUSTIFYING MECHANISM.
APPLICATION FILED AUG. 27, 1901.
NO MODEL. 19 SHEETS—SHEET 19.
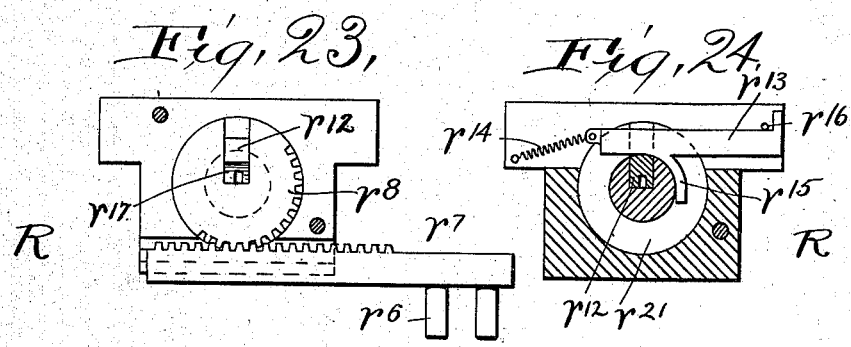
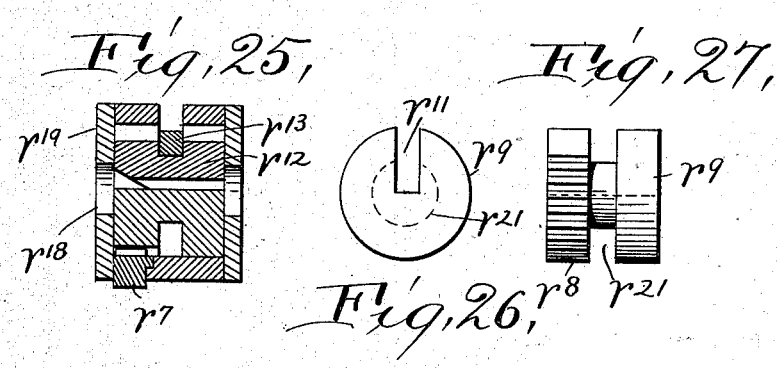
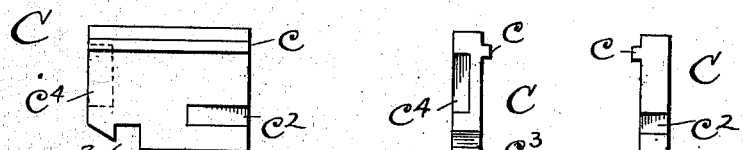
Witnesses
E. B. Gilchrist
May S. Metzenbaum
Inventor
Francis B. Converse Jr
By his attorneys
Thurston & Bates No. 738,741. Patented September 8, 1903.

UNITED STATES PATENT OFFICE.

FRANCIS B. CONVERSE, JR., OF CLEVELAND, OHIO, ASSIGNOR TO THE CONVERSE MANUFACTURING COMPANY, OF CLEVELAND, OHIO, A CORPORATION OF OHIO.

JUSTIFYING MECHANISM.

SPECIFICATION forming part of Letters Patent No. 738,741, dated September 8, 1903.

Application filed August 27, 1901. Serial No. 73,431. (No model.)

*To all whom it may concern:*

Be it known that I, FRANCIS B. CONVERSE, Jr., a citizen of the United States, residing at Cleveland, in the county of Cuyahoga and State of Ohio, have invented a certain new and useful Improvement in Justifying Mechanisms, of which the following is a full, clear, and exact description, reference being had to the accompanying drawings.

The object of this invention is to provide a simple, efficient, and rapidly-operating machine for the automatic justification of type. The term "type" is used herein as including both the cameo form, or ordinary printers' type, and the intaglio form, or matrices in which the printing-face may be cast.

The machine is adapted to operate in conjunction with any form of type-setting machine which is capable of delivering to it an assembled line of type with interposed temporary spaces at points in the line where regular type-spaces are to be inserted.

The complete machine comprehends the combination of the following coöperating mechanisms:

First. A suitable channel for carrying the line of type as it comes to the machine. This is preferably done by means of a combined assemblage and transferring member, which receives the line of type as set up and presents it to the other justifying mechanisms. The assemblage member thus makes a connecting element between a type-setting machine and the justifier.

Second. A space-recording mechanism which takes account of the number of spaces in the line.

Third. A line-measuring mechanism which measures the amount by which the line set up is different in length from the desired line as justified.

Fourth. A space-selecting mechanism which operates according to the number of spaces in the line and the variation in length of the line, being controlled by the two preceding mechanisms to determine the proper size of space required.

Fifth. A line-advancing mechanism to carry the line through the justifying mechanisms.

Sixth. A space-substituting mechanism which acts as such line is advanced to replace the temporary spaces by permanent spaces selected of the proper thickness.

Seventh. A mechanism called the "fractional spacing mechanism," (which is really a portion of the space-selecting mechanism,) effective when the line will not exactly justify with but one size of permanent space, whereby a portion of one size and a portion of another size may be used to make the proper aggregate thickness.

Eighth. A delivery and leading mechanism operating to transfer the justified line into the galley with or without leads, as desired.

The present invention is concerned to various extents with all the above mechanisms, as will hereinafter clearly appear from the claims. It should be noted, however, that many of these features are dominated by claims in my prior applications, Serial Nos. 699,697, 3,280, and 4,124, filed December 19, 1898, January 30, 1900, and February 5, 1900, respectively, many of the features herein being improvements on the corresponding mechanisms shown in one or more of said prior applications.

In the drawings the justifying system is shown as embodied in a machine for operating on ordinary printers' type, and such embodiment will now be described.

Figure 2:
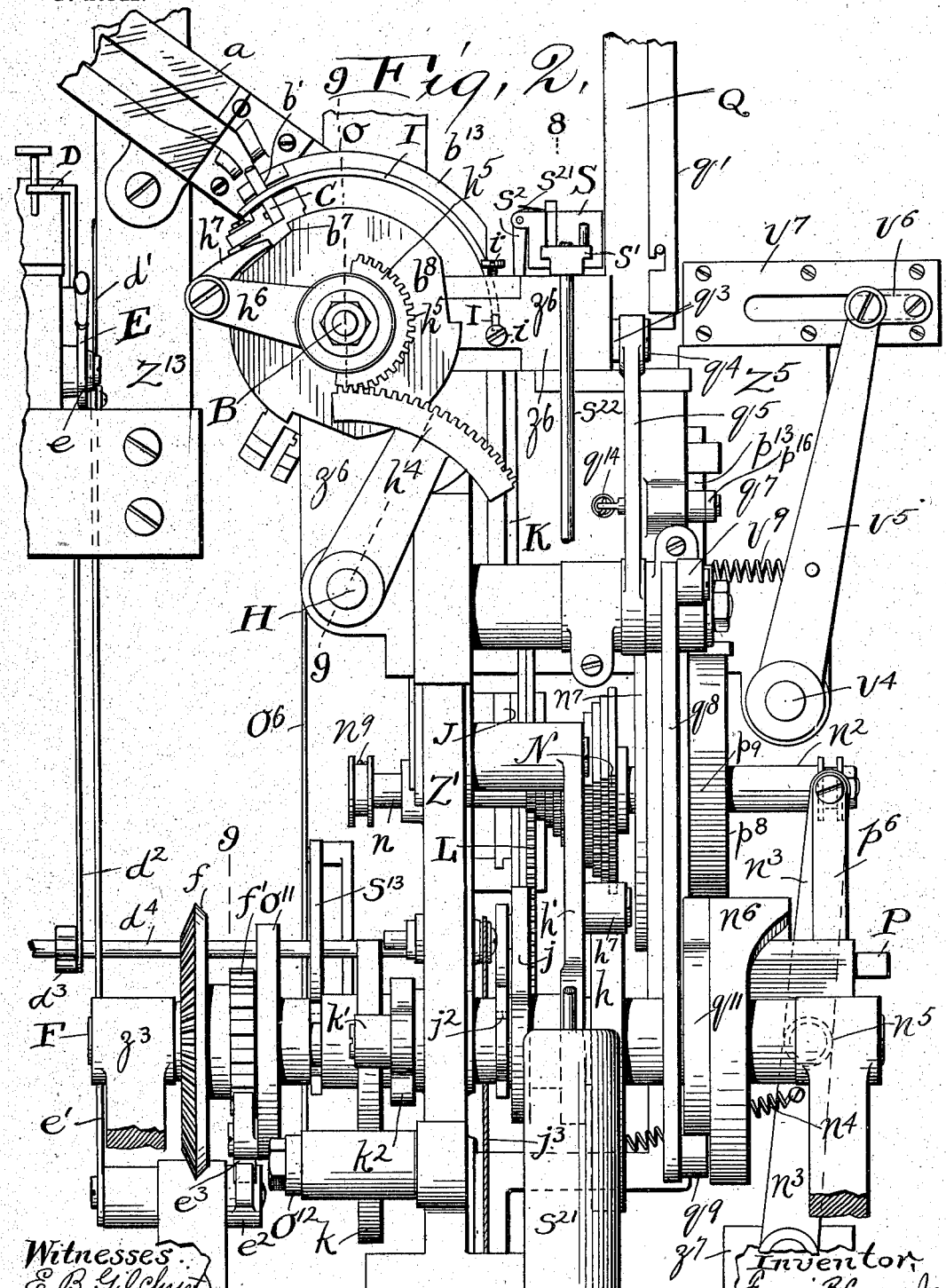
Figure 3:
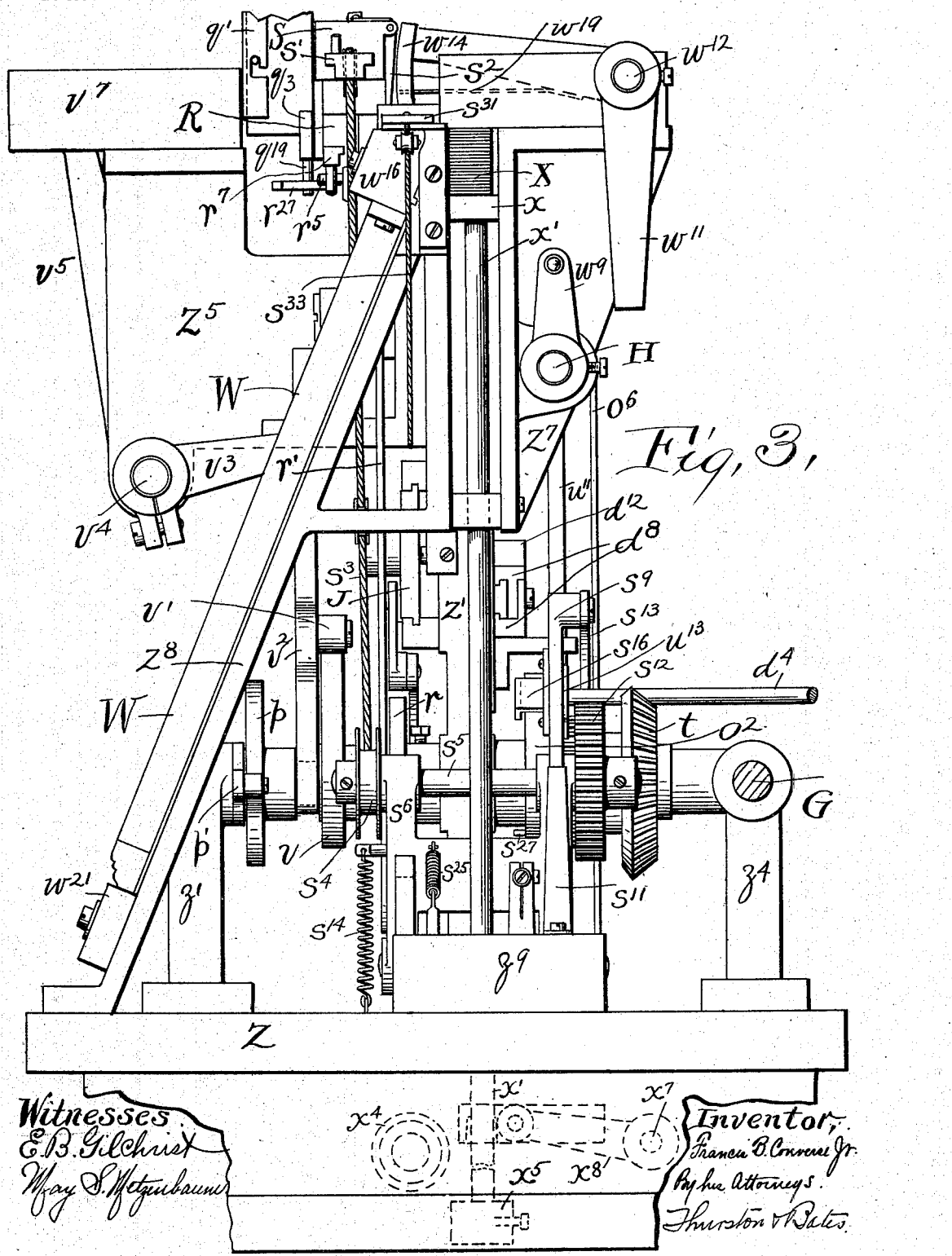
Figure 13:
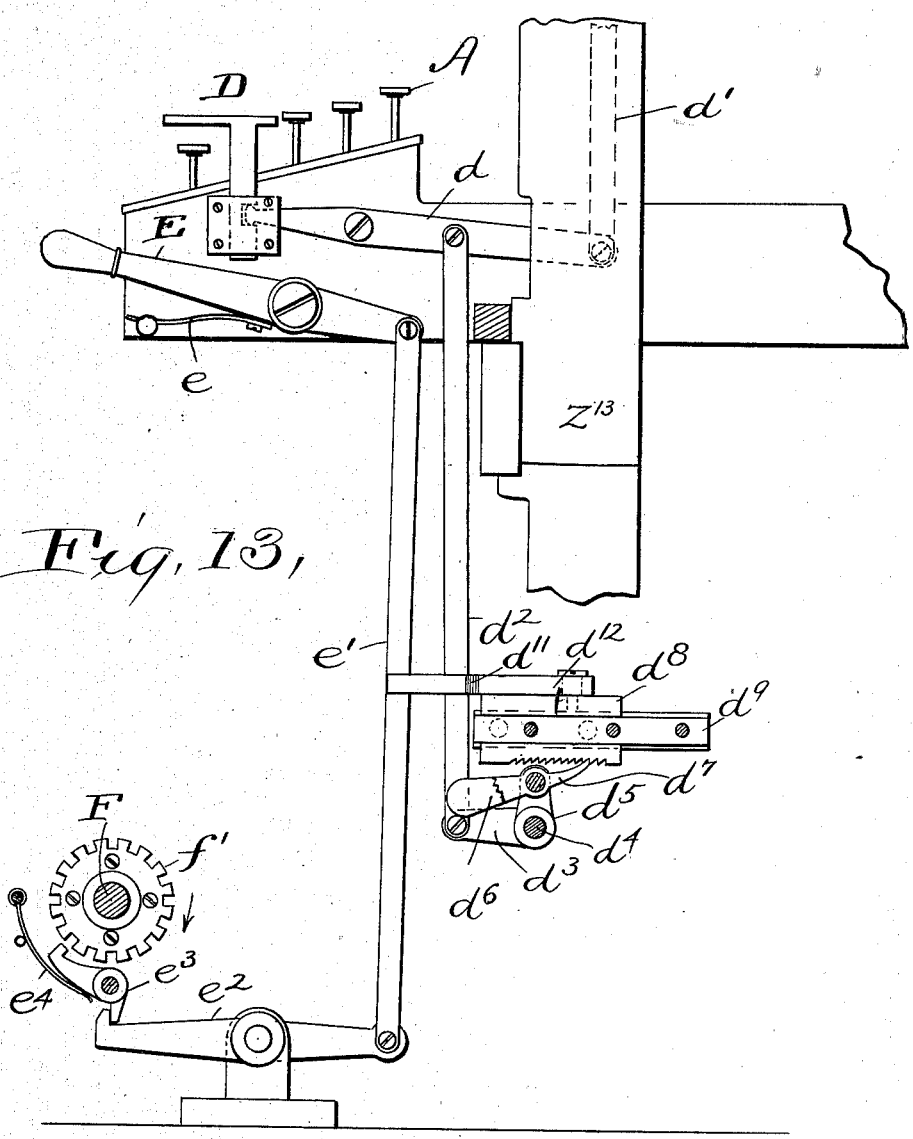

Figure 1 is a side elevation of the justifying mechanism, illustrating also the connections between the same and some type-setting machine. Fig. 2 is a front elevation of the justifying mechanism, and Fig. 3 is a rear elevation thereof. Figs. 4, 5, 6, and 7 are vertical sections through the justifying mechanism parallel with the plane of Fig. 2, being taken on the correspondingly-numbered lines on Fig. 1, Figs. 4 and 5 looking from the front of the machine and Figs. 6 and 7 from the rear. Fig. 8 is a vertical section parallel with the plane of Fig. 1, being substantially on the line 8 8 of Fig. 2. Fig. 9 is a side elevation in section, being substantially on the offset line 9 9 of Fig. 2 and looking toward the right of that figure. Fig. 10 is a plan of the justifying mechanism, showing in section the space-cases and the standards which may support the setting mechanism. Fig. 11 is a horizontal section a little below the plane of Fig. 10 and passing through the justifying-channel, being substantially on the line 11 11 of Fig. 1. Fig 11ᵃ is an enlarged detail showing the scale on the assemblage member, being a section on the line 11ᵃ 11ᵃ of Fig. 4, and Fig. 11ᵇ is a cross-section of the same on the line 11ᵇ 11ᵇ of Fig. 11ᵃ. Fig. 12 is a horizontal section through the operating-shafts, being on the line 12 12 of Fig. 1. Fig. 13 is a schematic view in side elevation of the keyboard, space-key, and line-lever and their connection with the justifying mechanism, being taken on a plane which is the rear side of the vertical supporting-plate shown in Fig. 6, for example, and looking in the same direction as in Fig. 1, the irrelevant parts being omitted. Fig. 14 is a rear view, in vertical section, of the delivery mechanism and leading mechanism, irrelevant mechanisms being omitted. Fig. 14ᵃ is a detail of the plunger-plate $w^{14}$ appearing in Fig. 14 and the pawl it carries, being a fragmentary side elevation. Fig. 15 is a schematic elevation of the parts coöperating in the fractional spacing operation, being an enlargement of a portion of Fig. 1 which shows these parts. Fig. 16 is a detailed plan on the line 16 16 of Fig. 1, showing, among other things, the space-recording mechanism. Fig. 17 is an enlarged horizontal section of the stepped block, its plunger, and the pawls which operate the stepped disk, being substantially on a plane just above these pawls. Fig. 18 is a horizontal section through the measuring-wedge, being on the line 18 18 of Fig. 8. Fig. 19 is a diagram illustrating the fractional spacing operation, the stepped block, and the stepped disk, which are actually in planes at right angles to each other, being here illustrated as in the same plane. Fig. 20 is a vertical section through the justifying-channel, showing the word-shaft trip, looking in the opposite direction from Fig. 9, which shows these parts. Fig. 21 is a plan showing the same parts and showing the mechanism for operating the space-turner. Fig. 22 is a vertical section through the follower-block S shown in Figs. 1 and 2, for example. Figs. 23 to 29 are details illustrating the space-turning mechanism, Fig. 23 being a side elevation thereof, Fig. 24 a vertical section parallel with Fig. 23, Fig. 25 an axial vertical section at right angles to Fig. 23, Fig. 26 a detail face view of the turning-barrel, Fig. 27 a side elevation of such barrel, Fig. 28 a side elevation of the holding-block which occupies the groove in the barrel, and Fig. 29 a bottom view of the same. Figs. 30 to 32 are details of the follower-blocks which occupy the assemblage-channels, Fig. 30 being a plan thereof, Fig. 31 an end view from the left of Fig. 30, and Fig. 32 an end view from the right of Fig. 30. Fig. 33 is a perspective view of the temporary space employed.

*Reference-letters.*—The scheme of reference-letters employed is to have each letter, whether large or small and with various exponents, refer to the same general division or submechanism, as follows:

A=Setter.
B=Assemblage member.
C=Followers.
D=Space-key mechanism.
E=Line-lever mechanism.
F=Line-shaft.
G=Power-shafts.
H=Transfer mechanism.
I=Adjustable stop for line-measurement.
J=Space-recording plate.
K=Measuring-wedge.
L=Rack for series of selecting-gears.
M=Temporary space.
N=Series of selecting-gears.
O=Temporary space-case.
P=Fractional spacing mechanisms.
Q=Permanent space-case.
R=Space-turner.
S=Advancing-block.
T=Word-shaft.
U=Word-shaft trip.
V=Space-ejector.
W=Galley.
X=Leading mechanism.
Y=Type.
Z=Frame.

*Frame.*—The justifying mechanism preferably has its own bed-plate Z, from which rises the vertical plate Z', which carries many of the mechanisms. Suitable vertical standards $z'$ to $z^5$, secured to the bed-plate, carry the main operating-shafts, as hereinafter described. The drawings illustrate uprights $z^{13}$, which may conveniently carry type-setting mechanism. Brackets and other frame parts will be referred to in connection with the parts they support.

*Assemblage and transfer mechanism.*—This mechanism receives the type from the type-setting mechanism and transfers it to the justifying mechanism. It appears in Figs. 1, 2, 4, 8, 9, 10, and 11. The drawings show keys A, Fig. 1, for operating the type-setting machine, which is presumed to be so arranged that when any key A is depressed some connection, as $a'$, actuates some mechanism (indicated by the gears $a^2$) which causes the corresponding type to descend through a conduit $a$ directly into one of the channels $b'$ of an assemblage member $b$. This assemblage member $b$ is secured upon a horizontal rotatable shaft B (journaled in the frame and the stationary bracket $z^6$) and carries a plurality of radial channels, each adapted to hold a line of type. As shown in the drawing Fig. 4, there are three of these channels, (designated $b'$,) which are formed between the face of projecting arms $b^2$ and angular strips $b^3$, which are so carried by the arms as to be adjustable thereon to vary the width of the channels $b'$. The adjustment is accomplished by supporting the angular strips $b^3$ on angular projections $b^4$ of the arms $b^2$ and clamping them thereto by screws $b^5$, taking through slots in the block $b^3$. Pins $b^{15}$, Figs. 8, 11$^a$, and 11$^b$, projecting from the strips $b^3$, take into the inclined slots $b^{16}$ in the gage-plates $b^{17}$, which are carried in grooves $b^{18}$ in the arms $b^2$. By inserting the point of a bodkin in the holes $b^{19}$ in these plates they may be moved lengthwise in the slots, moving thereby the strips $b^3$ to widen or narrow the channels $b'$ to receive the size of type indicated by the graduations on the gage-plates $b^{17}$, showing through an opening $b^{21}$ in the strip $b^3$. Occupying each channel of the assemblage member is a follower-block C. (Shown in position in Fig. 11 and shown in detail in Figs. 30 to 32.) This block has a rib $c$, which occupies a corresponding groove $b^6$ in the block $b^3$, whereby the follower-block may be held in the assemblage member while the channel swings through the under portion of the rotation. As shown in Fig. 2, the conduit $a$ and the position of the channels $b'$ is such that when one channel is in the horizontal position, and thus in alinement with the rearwardly-extending channel of the justifying mechanism, the next channel $b'$ is in position to receive the type discharged through the conduit $a$. Thus as the keys of the setting-machine are operated the type are delivered into the end of one of the channels $b'$ against the follower-block C, gradually shoving that follower-block toward the front of the machine, the setting mechanism having suitable means for so feeding the type forward as they are inserted. At the end of each word the depression of a space-key D, acting through a lever $d$ and a link $d'$, leading to the setting mechanism, as shown in Fig. 13, causes the insertion into the channel of a temporary space M, which is of the form shown in Fig. 33. This temporary space is preferably of the same width as the body of the type in use and is of a thickness equal to that of the thinnest regular space that the machine is adapted to insert in the justification of the line. It is inserted in the line with the notched side $m$ toward the right, so that when the assemblage channel is brought to the horizontal position this notch is on the lower side of the temporary space. The same depression of the space-key D which causes the insertion of this space also causes a record to be made of it on the space-recording mechanism, as hereinafter explained. As many words with interposed temporary spaces as the line would properly contain having been thus assembled, the operator actuates the line-lever. This is best shown in Fig. 13 and is designated E. It is normally held elevated by a spring $e$, and its depression raises the link $e'$, and thus withdraws the lever $e^2$ from engagement with the tail of the pawl $e^3$. Thereupon the spring $e^4$ forces the nose of this pawl into engagement with one of the notches on the notched disk $f'$. This pawl and spring are carried on the left-hand side of a cam $O^{11}$, Fig. 12, rigidly secured to the shaft F. This shaft is one of the main shafts of the machine and is called the "line-shaft." Loose upon this shaft is a bevel-gear $f$, to which is rigidly secured the notched disk $f'$ referred to. This bevel-gear is continuously rotated by meshing with the bevel-pinion $g'$, which is on a continuously-rotating shaft G. For convenience of construction and selection of speed this shaft G is arranged to receive its power from the continually-rotating main shaft G', Fig. 12, through the bevel-gears $g^4$ and $g^3$. Thus the depression of the line-lever E causes the shaft F to rotate. It makes, however, but one complete revolution, for as it comes to the end of such rotation the tail on the pawl $e^3$ engages with the end of the lever $e^2$, which withdraws the nose of the pawl out of engagement with the notched disk. One of the first operations of the rotation of the line-shaft F is to turn the assemblage member sufficiently to bring the channel containing the line just assembled to a horizontal position and at the same time to bring another channel into position to receive the succeeding line of type, thus permitting the assembling of the type to proceed continuously with practically no interruption. This is accomplished through the cam $h$. (Shown in Figs. 4 and 12 and also in Fig. 8 in dotted lines, since it is in front of the plane on which this section is taken.) This cam engages the roller $h^9$ on the link $h'$, which at its lower end is loosely yoked around the shaft F and at its upper end is secured to the vertical rack $h^2$, which is guided in a vertical recess on the rear side of the main frame-plate Z', Figs. 4 and 9. This rack $h^2$ engages with a segmental pinion $h^3$, which is rigid with the shaft H. On the forward end of this shaft H is a segmental gear $h^4$, Fig. 2, which meshes with a corresponding gear $h^5$, which is loosely journaled on the hub of a disk $b^8$, which is rigid on the forward end of the shaft B. This gear $h^5$ carries an arm $h^6$, on which is a pawl $h^7$, adapted to engage with ratchet-teeth $b^7$, formed in the edge of the disk $b^8$. There are as many of these teeth $b^7$ as there are channels $b'$. Thus when the cam $h$ elevates the link $h'$ the receiving-channel, which was in cooperation with the type-setting machine conduit $a$ and has just been filled with assembled type, is turned into a horizontal position, (the guard-plate $b^{13}$ at the rear end of the channel serving to retain the type in the channel while turning.) The pawl $h^7$ thereafter is idly returned to its normal position by the spring $h^8$, surrounding the shaft H, Fig. 9, in condition to again rotate the assemblage member at the next rotation of the line-shaft F.

*Space-recording mechanism.*—This is best shown in Figs. 6, 8, 9, 13, and 16. The space-key D of the setter has its lever $d$ connected by a link $d^2$, Figs. 2, 6, and 13, with a rocker-arm $d^3$ on a rock-shaft $d^4$, to which is secured another arm $d^5$, carrying a weighted pawl $d^6$. Directly adjacent to this pawl $d^6$ is a similar pawl $d^7$, carried by a stud projecting from the frame-plate Z'. The noses of these two pawls engage with teeth cut on the under side of the sliding block $d^8$, which for convenience of adjustment is made in two parts, as shown in Fig. 6, and slides upon the rigid guide-bar $d^9$, secured to the rear side of the plate Z'. Thus every time the space-key D is depressed the movable pawl $d^6$ feeds the block $d^8$ forward one tooth, and the stationary pawl $d^7$ holds it in this position against return. Thus during the assemblage of the line a record is made of the number of spaces in the line available for justification, and this record is automatically preserved for the justification of that line, so that the setting of spaces of the succeeding line may begin immediately by the following-described mechanism: In operative juxtaposition to the space-recording mechanism just referred to is a flat vertical plate J, Figs. 6, 8, and 16, on the forward side of the plate Z', guided to slide horizontally by the stationary gibs $j^9$, secured to the plate Z'. A cam $j$ on the line-shaft operating on the roller $j'$ of the link $j^2$, yoked around the shaft and connected to the plate J, moves this plate to its extreme rearward position—that is, the right hand of Figs. 8 and 16. When the decreasing face of the cam $j$ comes into juxtaposition with the roller $j'$, a weight (not shown) attached to the cord $j^3$, which passes over the sheave $j^4$ and is attached to the link $j^2$, draws the plate J to the left, Figs. 8 and 16, until the rear end of the slidable pin $j^6$ carried by that plate engages the incline $d^{11}$ of an arm $d^{12}$, pivoted to the space-recording block $d^8$ and pressed by a spring $d^{13}$ toward the plate Z'. When this engagement takes place, the pin $j^6$ is moved forward by reason of the incline $d^{11}$, and thereby through the pivoted lever $j^7$ moves rearward the pin $j^8$, which engages whatever tooth of the rack $j^{11}$ is opposite that pin. This rack $j^{11}$ is accurately adjustable, as shown, but is stationary in use. The above-described operation brings the plate J to rest at a point determined by the position of the space-recording block $d^8$, this operation taking place substantially while the assemblage member is being turned. Immediately thereafter a pin $d^{23}$, Figs. 4 and 9, riding above the roller $d^{22}$ on the lever $d^{21}$, causes the pawls $d^6$ $d^7$ to be disengaged from the block $d^8$, whereupon this block is returned by its spring $d^{15}$ to its normal position, ready for use in the next line.

Figure 5:
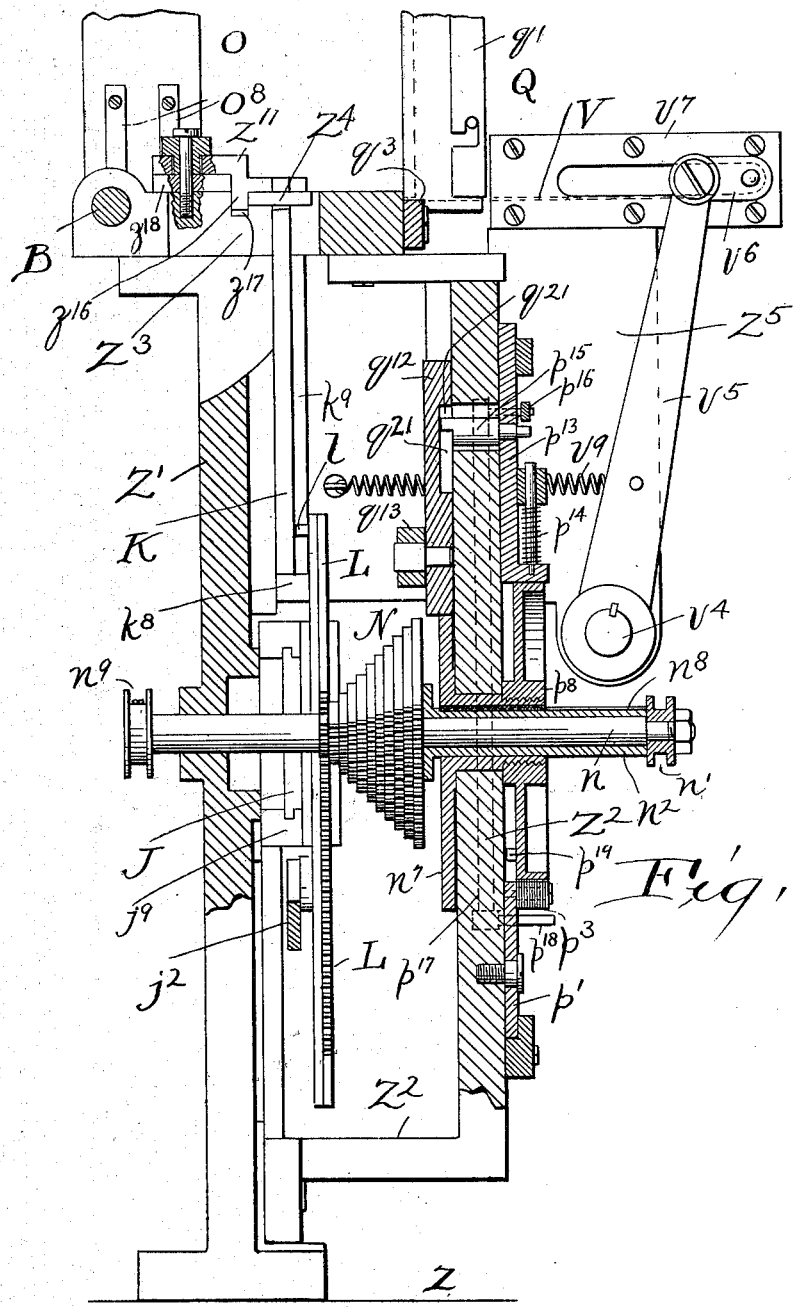

Vertically slidable in a guideway at the forward end of the plate J is a rack-bar L, Figs. 5, 8, and 16, which is adapted to mesh with the teeth of any of a series of gears N, hereinafter referred to. The particular gear with which the rack-bar meshes is dependent upon the position in which the plate J is left standing by the mechanism above described.

*Line-measuring mechanism.*—This mechanism acts after one of the gears N has come into engagement with the rack L, but may be most conveniently described now.

Referring to Fig. 8, there appears a wedge K, slidably carried by a tongue-and-groove connection parallel with its inclined edge by a stationary gib $k^9$, secured to the frame-plate Z'. This wedge stands just beneath the justifying-channel, (which is a shallow groove $Z^4$ in the horizontal plate $Z^3$ on top of the frame-plate Z', connecting with the rear end and forming a continuation of the horizontal channel of the assemblage member.) The vertical edge of the wedge is substantially in line with the rear of the assemblage member, wherefore it is adapted when elevated through a notch in the plate $Z^3$ and an opening $b^9$ in the wing of the assemblage member to pass across the line of type Y, Fig. 8, in the assemblage member, shoving the line and the follower C forward until the same are compacted against a suitable stop. Thus the rise of the wedge is dependent upon the line shortage. The stop referred to consists, as shown, of the bar I, the straight portion of which passes through and is secured in an opening in the bracket $z^6$. Its curved arm passes through openings $b^{12}$ in the wings of the assemblage member, serving as a guide in the channel in which the line is being assembled, preventing the operator from making the line too long to properly justify, and forming also a stop against which the line in the horizontal channel is compacted while being measured. This bar I is adjustable for different lengths of line, according to the width of the column in which the justified line is to be used. As shown, the adjustment is made by the screw $i$, which takes into the stationary bracket $z^6$ in front of the channel and is clamped by the set-screw $i'$. Succeeding the turning of the assemblage member and the adjustment of the space-recording plate J a decreasing face of the cam $k$, Figs. 9 and 12, on the line-shaft F comes into action against the roller $k'$ on the link $k^2$, which is yoked around that shaft, and allows this link to move to the rear, whereupon a weight (not shown) attached to a cord $k^3$, Fig. 8, running over a sheave $k^4$ and attached at its other end to a vertical rack-bar $k^5$, elevates this rack, the rack meshing with a gear $k^6$ on a shaft journaled in the plate Z' and having on its other end a pinion $k^7$, engaging with rack-teeth in the link $k^2$. The cam $k$ thus normally holds this bar $k^5$ in its lowermost position; but when the cam allows it to move the weight on the cord $k^3$ elevates it. Projecting forward from the bar $k^5$ near its upper end is the pin $k^{11}$, Figs. 8 and 18, which takes into a groove $k^{12}$, formed at a right angle with the vertical edge of the wedge in the rear side of a bar $k^8$, secured to the wedge near its lower end and in the wedge itself. The result is that the wedge is elevated with the rack by the weight on the cord $k^3$ and as it rises travels (by reason of its inclined guide) crosswise of the rack $k^6$ until it is stopped by compacting the line of type Y against the stop I. When this point is reached, the bar $k^5$ can rise no farther. Now preceding the rise of the wedge it will be remembered that the plate J had come to rest, holding the rack L in a definite lateral position dependent upon the number of spaces in the line, and then mechanism, shortly to be described, comes into operation and moves the series of gears N to the left until one of them meshes with the rack L, when the movement is stopped by the next larger gear overhanging and engaging the side of the rack. The construction and operation of these gears are hereinafter fully explained. Now this being the position of the parts when the rack-bar $k^5$ and the wedge rise, such movement also lifts up the rack L by reason of its pin $l$, Figs. 8 and 18, which overhangs the cross-bar $k^8$, wherefore the series of gears N is rotated by the rack L an angular distance proportionate (for any given gear that is engaged by the rack L) to the amount of rise of the wedge which is necessarily proportionate to the lateral movement of the wedge in compacting the type, which is equal to the line's shortage. It is desirable for convenient assemblage to provide for measuring the line not from the extreme rear end of the assemblage member, but from a point a short distance in front thereof, and the space between the pin $l$ (in the idle position of the rack as supported by its pin $l'$) and the bar $k^8$ in their normal positions is provided to allow a corresponding idle movement of the wedge. Following the above operation the increasing face of the cam $k$ draws down the rack-bar $k^5$ and the wedge to their normal positions, leaving the link L elevated and the system of gears N and their shaft in whatever position that link moved them on its upward stroke by reason of the friction brake-bar $p^{13}$, Figs. 1 and 5, bearing under the pressure of the spring $p^{14}$ on the periphery of the disk $p^8$, which is splined to the shaft $n$, as hereinafter more fully explained.

*Space-selecting mechanism.*—The system of gears N referred to consists of several gears of radii increasing in an arithmetical ratio arranged in a cone. The number of these gears is theoretically equal to the maximum number of spaces which may be justified by the machine, though for convenience of construction the gear for a one-space line is omitted, being unnecessary. Thus, as shown in the drawings, there are eleven gears, and this provides for lines having from two to twelve spaces to be justified, thus taking care of thirteen words, (a justifying-space between each two words.) As lines with more than that number of words are very unusual, it is not deemed necessary to provide more gears. Such abnormally-spaced lines as do occur are easily taken care of during the setting operation by the insertion of an ordinary printer's space between some of the words. If desired, however, a larger number of gears than those shown may be employed. The radius of the smallest of the complete series of gears being called 1—that is, the omitted gear, which would be brought into use in the justification of a line containing one space—the radius of the next gear is 2, (for a two-space line,) the radius of a three-space gear is 3, and so on, the radius of each gear being as many times that of the gear for one space as there are spaces in the line with which this gear is designed to operate. The gears N are all rigid with the shaft $n$, which is slidably and rotatably mounted in the plate Z' and in the bracket $Z^2$, rigid therewith, Figs. 5 and 16. On the forward end of this shaft is a collar $n'$, into which takes a pin $n^{12}$, carried by a lever $n^3$, which is pivoted to a small standard $z^7$ on the bed-plate Z and is given a tendency to move to the left by the spring $n^4$. This lever carries a roller $n^5$, which is adapted to be actuated by the crown-cam $n^6$ on the shaft F. Now the cam $n^6$ is so placed that immediately preceding the locating of the plate J the increasing face of this cam acts to move the series of gears to the right, taking them all out of the path of the rack L. The cam $j$ then acts to locate the plate J and rack L, as heretofore fully described, following which and before the wedge rises the decreasing face of the cam $n^6$ allows the spring $n^4$ to move the system of gears N rearward until one of them meshes with the rack L, the gears being held normally at a zero position, in which a tooth of each gear on the side toward the rack L is on the same horizontal line passing through the center of the shaft $n$, whence it follows that the rack being adjusted vertically to mesh with any gear any other gear may come accurately into mesh with it. A spring $n^{11}$, drawing on a cord attached to the drum $n^1$ on the shaft $n$, acts to hold them in this position, which is determined by a lug $p^{19}$ on the disk $p^8$ engaging a lug $z^{19}$ on the bracket $Z^2$. Now the position of this plate J if there were but one temporary space in the line would be such that the rack L would mesh with the smallest of the complete theoretic series of gears N. If there were two temporary spaces in the line, the plate J would be moved to the right in Figs. 8 and 16 a distance of one tooth on the rack $j^{11}$, which distance would just allow the next of the gears N to mesh with the rack. Thus that gear meshes with the rack which corresponds to the number of spaces in the line. The gear for the one-space line being omitted, it takes two depressions of the space-key, acting through the block $d^8$ and plate J, to bring the rack L into the position shown in Fig. 8, where it engages the smallest actual gear. The corresponding position of the block $d^8$ appears in Fig. 13. The return movement of the cone of gears is limited by the next larger gear than the one in mesh engaging the side of the rack L or, in the case of the largest gear, by the lowest face of the cam $n^6$, acting through the lever $n^3$.

It will be seen that the rotation which the rise of the wedge gives to the shaft $n$ is dependent upon the two factors of the number of spaces in the line and the line's shortage—the greater the shortage the greater the rotation for a given number of spaces and the greater the number of spaces the less the rotation for a given shortage.

A series of permanent spaces varying each from the next by a uniform amount is contained within the space-case Q, Figs. 1, 2, 10, 11, and 15. This case consists of a substantially vertical box divided by partitions $q$ into as many channels as there are different sizes of spaces to be used. The channels are all preferably of the same width, and the spaces lie therein on their flat sides. The space-case is preferably covered by a removable cover $q'$, and it is pivotally supported at its upper end. This is illustrated in Fig. 1, where the upper end of the space-case is removably carried by the yoke-block $q^2$, which is formed in two relatively adjustable parts and is pivoted to the frame of the setting-machine. As shown in the drawings, nine sizes of permanent spaces are provided, and these preferably vary from a thickness of .03 to .11 of an inch, inclusive, which range has been found in practice to be amply sufficient. The lower end of this space-case stands adjacent to the path of travel of the line of type through the machine in the justifying-channel $Z^4$, and being pivoted at its upper end its lower end may be swung through a small arc (substantially a straight line) to bring the channel containing the desired size of space opposite the point of removal and insertion into the line. Apertures in the lower end of the space-case opposite the lowest space of each channel permit an ejector V to operate through the space-channel, driving the space out of the channel into a rotatable member R, where it is turned on its longitudinal axis ninety degrees to bring it upon its edge in position to be properly inserted in the line in the manner hereinafter explained.

Figure 4:
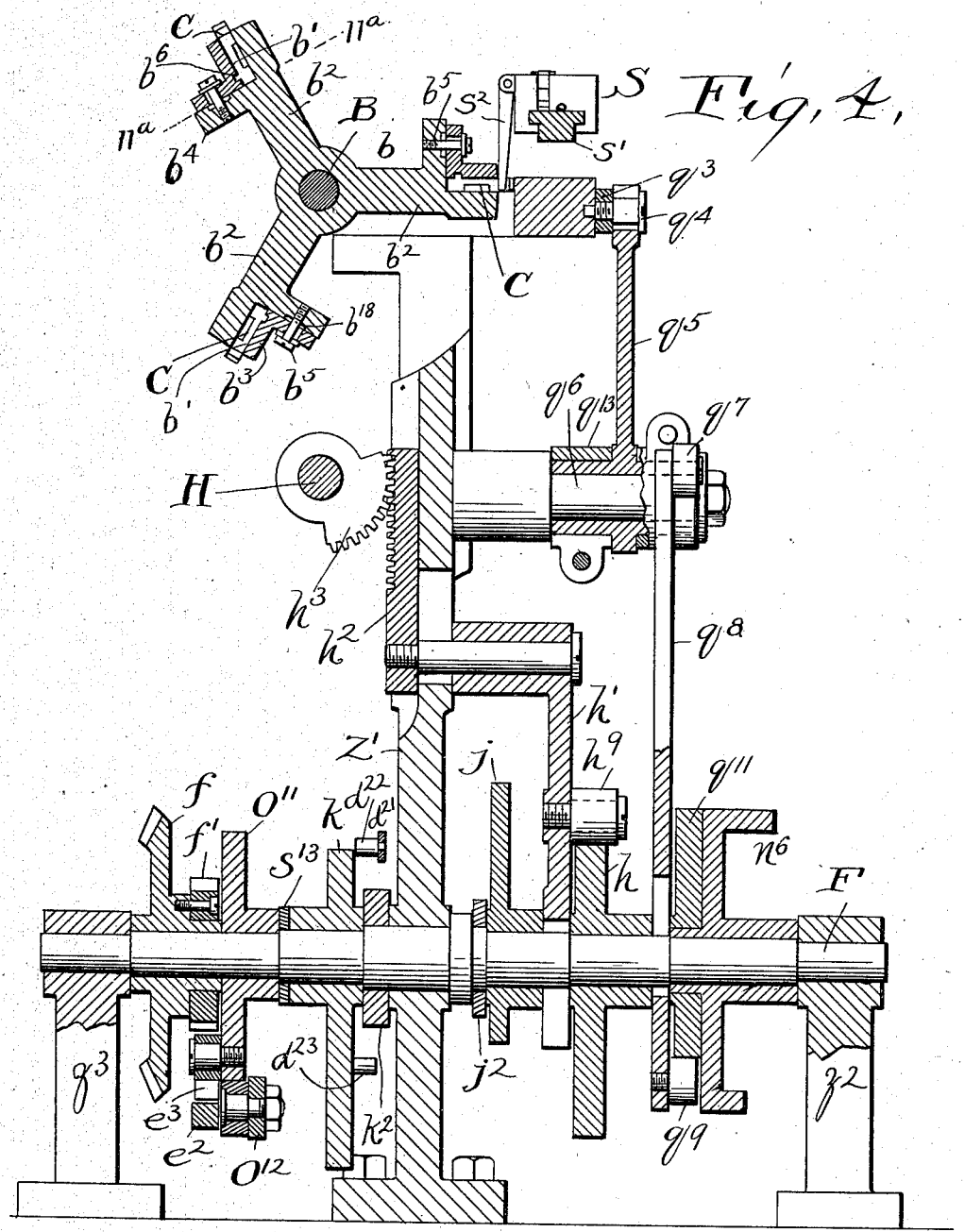

Engaging the lower end of the space-case Q is a slidable bar $q^3$, Figs. 4 and 15. This bar carries a pin $q^4$, around which yokes a rocker-arm $q^5$, journaled on the stud $q^6$. Secured to the hub of the rocker-arm $q^5$ is the rocker-arm $q^7$, connected to a link $q^8$, which yokes around the shaft F and carries a roller $q^9$, adapted to engage the cam $q^{11}$ on that shaft. As the line-shaft begins its rotation an increasing face of this cam draws down the link $q^8$, which shifts the space-case to the extreme left, Fig. 15, and there holds it for about half a rotation, while the operations as heretofore described are going on. These operations have rotated the shaft $n$ and have thus carried with it a stepped disk $n^7$, Figs. 5, 15, and 16, which is rotatably mounted in the rigid bracket $Z^2$ and is splined to the shaft $n$, preferably through the intervention of the sleeve $n^2$, (used to hold the gears N securely in place,) which is rigid with that shaft and has a groove $n^8$, in which the spline takes. The disk $n^7$, which I call the "selecting-block," has as many steps (including its outermost periphery) as there are channels in the space-case, and the rises of these steps are proportionate to the distance between those channels as determined by the proportions of the connecting mechanism. This connecting mechanism consists of a plunger $q^{12}$, suitably guided by the bracket $Z^2$, having a pin about which yokes an arm $q^{13}$, carried by the hub of the arm $q^5$. A spring $q^{14}$ tends to draw the arm $q^5$ to the right, Fig. 15, and hence to bring the plunger onto the step in line with it. Now if the plunger $q^{12}$ is engaging the step of least radius the space-case will be at its extreme right-hand position, which is the position shown in Fig. 15 and is that position wherein the smallest-size space (the one in the left-hand channel of the space-case) is in the ejection-line, as shown in Fig. 11. If the plunger should rest on the second step, the second-size space would be in such ejection-line, and so on. While the plunger is held out of engagement with the disk $n^6$ by the concentric face of the cam $q^{11}$ the disk is rotated by the rack L, as already explained, according to the composite result of the number of spaces in the line and the line's shortage, wherefore when the decreasing face of the cam $q^{11}$ acts upon the roller $q^9$ in the latter part of the rotation of the shaft F the plunger moves toward the disk and comes to rest on some step of the disk determined by the aforesaid two factors of the line's shortage and the number of spaces in the line. When it comes to rest, the space-case Q is thereby held with the corresponding size of space in the ejection-line and the rest of the rotation of the cam $q^{11}$ is idle.

*Line-advancing mechanism.*—After the setting of the parts to cause the selection of the proper size of space is completed mechanism is automatically thrown into operation to advance the line to bring the first temporary space opposite the point of ejection, where it is adapted to be replaced by a properly-selected permanent space. This line-advancing mechanism includes a reciprocating block S, Figs. 1, 2, 4, 10, and 22, which is adapted to travel from the front toward the rear of the machine on a suitable horizontal guide $s'$. The block has a downwardly-extending arm $s^2$, which is adapted to extend into the notch $c^3$ on the follower C, Figs. 11 and 30, being held therein by the spring $s^{21}$, Figs. 2 and 10, on the block, whereby the line is shoved along as the block is advanced. This advancement is caused by a cord $s^3$, attached at its forward end to the block and extending rearward across a pulley and then downward and secured at its extreme end to a drum $s^4$, Figs. 3, 9, and 12. This drum $s^4$ is rigid on the shaft $s^5$, which is carried by a swinging frame $s^6$, pivoted at its lower end to another frame $s^7$, which is pivoted to the stationary support $z^9$. A lug $s^8$ on the frame $s^6$ normally engages a corresponding lug on a lever $s^9$ and is normally held in such engagement by the springs $s^{11}$ and $s^{25}$. This position of engagement is such that a gear $s^{12}$ on the right-hand end of the shaft $s^5$ is normally out of mesh with a continuously-rotating gear $t^2$, rigidly secured to the bevel-gear $t$, which is in mesh with the bevel-gear $g^2$ on the power-shaft G. A link $s^{13}$ is connected at one end with the upper end of the lever $s^9$ and at the other end yokes around the line-shaft F and carries a roller adapted to be engaged by a cam on that shaft. This cam consists of a projection $s^{26}$, Figs. 9 and 12, on the hub of the cam $k$. Now when this projection engages the roller on the link $s^{13}$ the latter swings the lever $s^9$ to disengage the lug $s^8$, and the frame $s^6$ swings downward under the action of the spring $s^{14}$, Figs. 3 and 9, until the lug $s^8$ stands in front of the lug on the lever $s^9$. The projection $s^{26}$, above referred to, having passed the roller on the link $s^{13}$, the spring $s^{11}$, acting through the lever $s^9$, presses the frame $s^6$ forward, bringing the gear $s^{12}$ into mesh with the gear $t^2$, thereby rotating the drum $s^4$ to advance the block S, and with it the line of type. The line is thus advanced along the justifying-channel formed by the groove $Z^4$ in the frame-plate $Z^3$, Figs. 6 and 7, covered by the plate $z^{11}$, which is stationary in use, but is adjustable (by placing a shim, as $z^{18}$, of the required thickness under it) to fit the channel to any required size of type. This plate $z^{11}$ has a rib $z^{16}$ depending into a groove $z^{17}$ in the base of the justifying-channel, so as to close the rear side of that channel whatever the adjustment. The advancement of the line shoves ahead of it the skeleton retaining-bar $s^{31}$, Fig. 11, which occupies the justifying-channel and is pressed forward by the light weight $s^{32}$ on the cord $s^{33}$, Fig. 1, until the first temporary space in the line comes opposite the point of insertion of the permanent spaces. The line is there stopped by the word-shaft trip U, Fig. 9, springing into the notch $m$ of the temporary space M, as hereinafter explained, and thereupon the rotation of the gear $s^{12}$, continuing to wind the cord $s^3$ upon the drum, causes the frame $s^6$ to be lifted, raising the lug $s^8$ above the engaging lug on the lever $s^9$, thereby permitting the spring $s^{25}$ to swing the upper end of the frame rearward to disengage the gears $s^{12}$ and $t^2$. This brings the advancing mechanism to rest until again operated. The word-shaft trip which caused this stoppage is best shown in Figs. 20 and 21. It occupies a recess $z^{13}$ at the base of the justifying-channel $Z^4$ in the plate $Z^3$. The line is advanced from the left in these two figures, and the type therein shove down the inclined nose $u'$ of the lever $u$, which is journaled on the stud $u^2$. This forces down the forward end of the spring $u^3$, giving the rear end a pressure upward against the broader lever or trip U, which carries the upwardly-projecting noses $u^{17}$ $u^{17}$, which are normally just below the justifying-channel and just to the front of the ejection-line through the opening $z^{14}$. The line of type passes over the trip with these noses pressing up against the bottom of the type idly until a temporary space is encountered, when the noses spring up into the notch $m$ in that space, whereupon the trip becomes locked to the line of type. Now the engaged trip is shoved with the line a slight distance allowed by the lever U, being slottedly journaled on the pin $u^4$, and this swings the lever $u^6$ against the projecting arm $u^7$, Fig. 9, which is rigid with the rock-shaft $u^8$, which has an arm $u^9$, connected to a link $u^{11}$. This link is normally in engagement with the tail of a pawl $u^{13}$, carried on the rear side of a cam $o^2$ on the shaft T, which is called the "word-shaft." It thus results that as soon as the advancing line of type comes to rest with its first temporary space in the ejection-line by reason of that temporary space engaging the trip U the latter releases the pawl $u^{13}$ which under the influence of the spring $u^{15}$ springs into engagement with the notched disk $t'$, rigid with the rotating gear $t$, wherefore the word-shaft is caused to rotate. This word-shaft causes by its rotation the insertion of a permanent space and the corresponding ejection of the temporary space and the subsequent advancement of the line. These operations will now be described.

*Space substituting and subsequent advancement of line.*—The first action of the word-shaft T is to allow a decreasing face of the cam $v$, Figs. 3 and 7, to act on the roller $v'$ of the link $v^2$, which is connected by a rocker-arm $v^3$ with the rock-shaft $v^4$, on which is the rock-lever $v^5$, Figs. 1, 2, 5, and 7, connected by a link $v^6$ with the ejector-bar V, which is housed in a suitable guide-box $v^7$, carried by a frame-bracket $Z^5$. This allows the spring $v^9$, acting on the arm $v^5$, to move the ejector forward, shoving the lowest space in the properly-selected channel of the space-case Q, from that channel into the space-turner R, Figs. 6 and 11, which consists of a rotatable barrel and whose operation will be presently described. As soon as the space is thus inserted in the turner this barrel is rotated ninety degrees, turning the space from its flat side onto its edge, while simultaneously the depending tail of the dog $u^4$, pivoted to the trip U at its forward end, is swung (as hereinafter explained) to cause the nose $u^{14}$ of the dog, which occupies the notch $m$ of the temporary space, to open a gap in the line at the temporary space. These operations take place while a concentric face of the cam $v$ is passing the roller $v'$. Thereafter a further decreasing face on this cam allows the spring $v^9$ to shove the temporary space from the space-turner into the space-channel, shoving out the temporary space ahead of it into the opening $z^{14}$. The turning of the space being injected and the making a gap for it is accomplished by the cam $r$, Figs. 7 and 8, on the word-shaft T, the decreasing face of which comes into cooperation with the roller on the link $r'$, allowing the spring $r^2$ to raise this link while the permanent space is within the space-turner. This link rising shoves upward one arm $r^4$ of a bell-crank lever, and thus swings its upwardly-projecting arm $r^3$ toward the front of the machine. This arm $r^3$ carries at its upper end a pin $r^5$, which takes between a pair of depending lugs $r^6$ on a slidable rack-bar $r^7$, the teeth of which mesh with teeth $r^8$, formed in the periphery of the barrel $r^9$ of the space-turner R, thus rotating the turner ninety degrees. The arrangement of the space-turner clearly appears in Figs. 23 to 29. The barrel $r^9$ has a radial opening $r^{11}$, in which seats the follower-block $r^{12}$, normally pressed toward its seat by a dog $r^{13}$, drawn by a spring $r^{14}$ against the follower-block $r^{12}$ and having a curved depending leg $r^{15}$ occupying the peripheral groove $r^{21}$ in the barrel and engaging the follower-block whatever its position. This dog is loosely held in place by the pin $r^{16}$, which allows it to accommodate itself to the position of the follower. The follower is inclined at its forward end $r^{17}$, and the type being inserted through an opening $r^{18}$ in the housing $r^{19}$ meets this incline and shoves the follower-block outwardly accordingly, the dog $r^{13}$ always keeping the follower-block against the space to hold it in place in the turner. Now extending from the base of the rack $r^7$, Fig. 21, toward the justifying-channel is a rigid arm $r^{25}$, from which depends a pin $r^{26}$, (also Figs. 6 and 8,) which pin normally holds out of action a lever-arm $r^{27}$, which is given a tendency by the spring $r^{28}$ to swing toward the front of the machine. As the rack $r^7$ moves in this direction this arm $r^{27}$ is released to that extent, and it shoves forward the tail of the dog $u^4$, the upper end of which occupies the notch of the temporary space, and this movement of the dog shoves along the type ahead thereof, making a gap in the line of type for the reception of the permanent space. The forward movement of the arm $r^{27}$ is stopped by its engaging with a pin $q^{19}$, Figs. 6, 8, and 21, depending from the slide $q^3$, which moves the space-case. The purpose of this is to regulate the gap produced, according to the size of space to be inserted. The smallest permanent spaces are at the forward or left side of the space-case and the thickest at the rear or right side. Now if the smallest size is in the ejection-line the space-case is at its extreme right, and the least of its movements is allowed to the arm $r^{27}$. If the second-size space is in the ejection-line, the bar $q^3$ and the pin $q^{19}$ are moved to the left and the bar $r^{27}$ is allowed a larger movement, making a larger gap. When the bar $q^3$ is at its extreme left position, the largest size of permanent space is in the ejection-line and the largest gap is produced by the movement of the arm $r^{27}$. After the turning of the permanent space and the opening of the gap in the line the permanent space is shoved into this gap as a decreasing face of the cam $v$ comes into action by the ejector passing through the turner, (the now horizontal groove $r^{22}$ in the edge of the follower $r^{12}$ permitting its passage,) and as the permanent space is inserted in the line the temporary space is shoved out ahead thereof through the opening $z^{15}$ in the depending lug $z^{16}$ of the plate $z^{11}$ and into the groove $z^{14}$, where the next temporary space ejected advances it directly beneath the temporary-space case O and directly above the plunger O', Figs. 6, 9, and 21. Immediately thereafter a decreasing face on the cam $o^2$ comes into juxtaposition with the roller $o^3$ on the pivoted lever $o^4$ and allows the spring $o^5$ to draw that lever upward, which thus lifts the link $o^6$, shoving the plate $o'$, to which it is connected, upward and carrying the temporary space up into the temporary-space case above the pawls $o^7$, pressed therein by the springs $o^8$. Thereupon the increasing face of the cam $o^2$ withdraws the plunger. As the substitution proceeds these temporary spaces are continually shoved up into the temporary-space case. When the line-shaft is again actuated for the succeeding line, the cam $o^{11}$, Fig. 9, thereon immediately acts to release the roller on the lever $o^{12}$, and the spring $o^{13}$ draws that lever upward, thus raising the link $o^6$ and the plunger $o'$ high enough to return all the temporary spaces in the space-case to their initial position, so that at least the maximum number which may be used in a line are in position at the upper end of the case to be ejected in the setting operation. Fig. 1 illustrates how the temporary case may extend up into the setting-machine and illustrates also a spring-pressed pawl $o^{15}$ for retaining the spaces thereabove in position to be ejected. The temporary spaces thus continually circulate through the machine, and when the machine is idle the total supply is contained within the temporary-space case. Now a pin $s^{27}$, projecting from the side of the cam $o^2$, engages a bar $s^{16}$, Figs. 3 and 9, projecting from the lever $s^9$, forcing it out of engagement with the lug $s^8$ and causing engagement between the gear $s^{12}$ and the gear $t^2$ as before. This causes the line to be again advanced until the next temporary space is engaged. This again withdraws the link $u^{11}$ from the path of the pawl $u^{13}$, this withdrawal being usually slightly before the engagement of the pawl by the link would take place and the shaft T naturally come to rest. Thus the shaft T again rotates and again ejects a permanent space from the space-case, turns it ninety degrees, inserts it in the line in place of the temporary-space, and shoves the temporary space up into its case and advances the line. This sequence of operations continues for each temporary space in the line until they are all replaced by permanent spaces. Now as it will usually happen that a line cannot be justified by the use of but one size of permanent spaces throughout mechanism is provided to cause the changing of position of the space-case at the proper time during the justification to cause the remainder of the spaces to be of a different size.

This operation will be explained later under the heading of "fractional-spacing mechanism." The completely-justified line is advanced (there being nothing for the trip U to engage to stop the advancement after the last temporary space has been removed) until it is opposite the mouth of the galley. Here it remains, being held by the gravity-pawl $s^{34}$, Figs. 10 and 14$^a$, which was lifted by the passing line of type and which dropped in behind the line when the latter had passed it (the notch $c^2$ in the follower permitting the pawl to thus engage the type) until the line-shaft is again operated for the justification of the next line assembled, when this preceding line is delivered into the galley, as hereinafter explained. As the line was being advanced by the drawing along of the follower-block S a weight $s^{21}$, Figs. 1 and 2, slidable on a vertical rod $s^{22}$ and connected by a cord $s^{23}$ with the block S, was tending to return that block to its initial position; but this tendency was prevented by the pivoted dog $s^{18}$, Fig. 22, bearing on the rail $s'$ to bite against it and prevent such return. As soon as the line reaches its final position, however, the point of this dog comes into a recess in the rail $s^{28}$, Fig. 10, which prevents its locking action and allows the weight $s^{21}$ to draw the block in the opposite direction, the advancing mechanism having been thrown out of action by the block S being brought to rest against the pin $s^{36}$, the dog $s^{18}$ trailing idly. The skeleton bar $s^{31}$ also returns (after the line of type between it and the pawl $s^{34}$ has been depressed into the galley, as below described) the bevel $s^{35}$, Fig. 11, on its cross-bar, allowing the same to pass under the pawl $s^{34}$. In this movement the incline $c^4$ in the follower C forces down the word-shaft trip, so that the follower may pass over it. Then the beveled lug $b^{11}$ on the assemblage member forces the arm $s^2$ out of the notch $c^3$, leaving the follower C at the rear end of the assemblage-channel ready in its turn to receive a line being assembled. Finally when the forward position of the block S is reached the dog $s^{18}$ comes into a recess near the forward end of the rail $s'$, as $s^{29}$, Fig. 22, and assumes a vertical position ready to trail in the other direction when the block is drawn rearward.

*Fractional spacing mechanism.*—For the sake of a more ready understanding a description of this important feature of the selecting operation has been omitted until this point.

As stated, it will happen that most lines will require more than a single size of spaces to properly justify them, it not being practicable to carry in the machine enough different sizes of spaces to permit all lines to be sufficiently closely justified by the insertion of only a single size. It is therefore necessary to provide means for the selection of a portion of the spaces in any line of one size and the remainder of the spaces of another size, preferably of the next adjacent size, (in the machine as at present constructed of the next smaller size.) Thus, by way of illustration, the spaces used in the present machine are three-hundredths, four-hundredths, five-hundredths, six-hundredths, &c., of an inch in thickness, each size being one-hundredth of an inch thicker than the preceding size. Now if the line to be justified contains seven spaces and is, exclusive of the temporary spaces in the line, thirty-eight hundredths of an inch short, seven spaces each five-hundredths of an inch in thickness if inserted would aggregate thirty-five hundredths and leave the line three-hundredths of an inch too short, and seven spaces each six-hundredths of an inch in thickness would aggregate forty-two hundredths of an inch and make the line four-hundredths of an inch too long; but the proper justification of this line can be accomplished by inserting three six-hundredths-of-an-inch spaces (amounting to eighteen-hundredths) and four five-hundredths-of-an-inch spaces (amounting to twenty-hundredths,) the aggregate of which is equal to the required thirty-eight-hundredth inch. It is necessary, therefore, that the space-case be moved after the insertion of the first three spaces to cause the remaining spaces inserted in this line to be of the next size smaller. Mechanism for doing this (called the "fractional spacing mechanism") will now be described.

Referring to Figs. 1, 2, 5, 12, 15, 16, 17, and 19, as heretofore stated there is rigidly fixed to the hub of the disk $n^7$ another disk $p^8$ on the forward side of the bracket $Z^2$. This disk $p^8$ has on a portion of its periphery fine ratchet-teeth $p^9$. A decreasing face of a cam $p$ on the word-shaft T coming into coöperation with the roller on the link $p'$ succeeding the insertion of each permanent space allows the spring $p^2$ to draw that link forward. Now this link carries a series of pawls $p^3$, journaled side by side on the same pivot and having on their forward ends teeth adapted to engage the teeth $p^9$. Several of these pawls are provided each with its teeth $p^{21}$ set slightly back from the adjacent one, so that some pawl will engage the teeth $p^9$ without lost movement, the variation of teeth between the extreme pawls being substantially that of the distance between adjacent teeth $p^9$. Thus if there are twelve pawls, for example, as shown, the greatest lost play which would result would be one-thirteenth of the distance between adjacent teeth $p^9$. The pawl-teeth $p^{21}$ may thus be said to be "verniered." They are conveniently constructed by collecting the pawls on an arbor and milling the teeth slightly diagonally across them all. Opposite the end of the link $p'$ carrying the pawls is a block P, arranged in a suitable housing $p^4$ and capable of movement at right angles to the link, the link and an adjustable projection $p^5$ carried thereby constituting a "plunger" adapted to engage the block.

I use the term "plunger" herein as including any relatively movable engaging member. This block P has a rigid upwardly-extending arm $p^6$ engaging by a slot the pin $n^{12}$, which connects the lever $n^3$ with the shaft $n$. Thus this block is given a position according to which of the gears N is in action—that is, according to the number of spaces in the line. On the face of this block, adjacent to the end of the plunger $p^5$, is a series of steps, the steps being of a constantly-varying height from one end of the block to the other and there being as many steps thus formed in the block as there are gears on the shaft. Now when the cam $p$ allows it the link $p'$ moves forward until stopped by the plunger $p^5$ engaging whatever step of the block P is in its path, and this gives to the disk $p^8$, and hence to the stepped disk $n^7$, a retrograde movement determined by which step of the block P is in active position. If there were a gear N operative for a line containing one temporary space, the step on the block which would then be opposite the plunger $p^5$ would be such as to permit the pawl to turn the disks through an angular distance of one of the steps on the stepped disk. As a one-space line, however, practically never occurs, I have omitted such gear in the present embodiment of the machine, and the first gear which appears is the gear for a two-space line. Now the step of the block corresponding to this No. 2 gear is such as to turn the stepped disk through half of one of its steps, and the step corresponding to the No. 3 gear allows the disk to be turned through one-third of a step, the step corresponding to the No. 4 gear through one-fourth of the length of its step, &c. Thus the distances of these steps from a given datum-line (which is the position of rest of the face end of the plunger) is an inverse arithmetic series or, more technically stated, a "harmonic series." The individual rises of the steps are the differences between the consecutive terms of the harmonic series. Thus the rise from the first (theoretic) step to the second is $\frac{1}{1}-\frac{1}{2}$, and from the second to the third is $\frac{1}{2}-\frac{1}{3}$, and from the third to the fourth is $\frac{1}{3}-\frac{1}{4}$, from the fourth to the fifth is $\frac{1}{4}-\frac{1}{5}$, and so on. Indicating these subtractions with a single denominator in each term gives a series of $$\frac{1\times 2 - 1\times 1}{1\times 2}, \frac{1\times 3 - 1\times 2}{2\times 3},$$
$$\frac{1\times 4 - 1\times 3}{3\times 4}, \frac{1\times 5 - 1\times 4}{4\times 5}, \&c.,$$

or, simplified, $$\frac{1}{1\times 2}, \frac{1}{2\times 3}, \frac{1}{3\times 4}, \frac{1}{4\times 5}.$$

Thus the individual rises constitute a series each term of which has a numerator of unity and a denominator which is the product of the number of spaces in the two lines corresponding to the two steps between which the rise extends. Letting $n$ represent the number of the term of the series, the formula for each rise is $\dfrac{1}{n(n+1)}$.

The diagram Fig. 19 illustrates the plunger $p'$ $p^5$ and pawls $p^3$ consolidated into one theoretic member and shows the block P and the stepped disk $n^7$ on the same scale. The datum-line of the plunger coincides with its end in this figure, being a projection of the plane of the face of the block P, where there are no steps. Now the movement of the disk $n^7$ will be through an arc of the pitch-circle of the teeth $p^9$ equal to the distance from the tread of the step of said datum-line, the pawls $p^3$ making, in effect, a horizontal rack engagement with the disk $p^8$. This pitch-circle happens to coincide with the fifth step on the disk $n^7$, as shown in the diagram, (the periphery of the smallest radius being called the "first" step,) and, as will be seen, the distance of the steps of the block P from the plunger are a harmonic series (one-half, one-third, one-fourth, &c.) of the circular length of the step. If there were a step for the one-space line, it would be the whole arc. The step for two spaces is one-half of this arc. The step for three spaces is one-third thereof, as illustrated in the diagram. Now, it being remembered that the annular length of each of the steps on the disk $n^7$ is the same, (their arc-length varying accordingly,) it will be seen that when the plunger moves from its datum position until it engages a step of the block P the disk $n^7$ is rotated in a retrograde direction by an amount which is such portion of the whole step as is the fraction denominating the step of the block P, which fraction is the reciprocal of the number of spaces in the line. In other words, the portion of a step which is turned back at each movement of the plunger is the reciprocal of the number of spaces in the line, these reciprocals making the harmonic series of one, one-half, one-third, one-fourth, &c., for one, two, three, and four, &c., spaces in the line. The effect of this retrograde rotation is to cause the step of the disk upon which the plunger $q^{12}$, Fig. 15, is resting to pass ordinarily at some point in the operation from beneath the plunger, allowing that member to descend upon the next step of the disk, and this allows the spring $q^{14}$ to shift the space-case Q one channel to the right, bringing into play the next smaller size of space to cause the insertion of such smaller size throughout the remainder of the line. A consideration of the mathematical relations upon which this mechanism is constructed will make this operation clear. The taper of the measuring-wedge and the size of the first or smallest (theoretic) gear for a one-space line are such as to cause the rotation of the stepped disk through the angular length of the step for each one hundredth of an inch—that is, the unit of difference in sizes of the spaces—of shortness in the line as measured. The series of permanent spaces are: first size, three-hundredths of an inch thick; second size, four-hundredths of an inch thick; third size, five-hundredths of an inch thick; fourth size, six-hundredths of an inch thick; fifth size, seven-hundredths of an inch thick; sixth size, eight-hundredths of an inch thick; seventh size, nine-hundredths of an inch thick; eighth size, ten-hundredths of an inch thick; ninth size, eleven-hundredth of an inch thick. The temporary space is three-hundredths of an inch thick. When the second gear is engaged, this angular movement is one-half of the length of the step of the disk for each hundredth of an inch of shortness in the length of the line, and likewise for each succeeding gear the angular movement of the stepped disk is equal to the length of its step divided by the theoretic number of the gear engaged. In other words, as stated, the portion of a step which is moved for each unit of shortness of the line is the reciprocal of the number of spaces in that line. For further illustration, assuming that our line, as before, has seven spaces in it, the seventh gear will therefore be engaged, and for each hundredth of an inch of shortness in the line the stepped disk will be rotated one-seventh of the angular length of the step. Thus if the line with temporary spaces in place were thirty-five hundredths of an inch short the movement of the measuring-wedge would rotate the stepped disk thirty-five sevenths of the angular length of the steps, which would be five complete steps, bringing the plunger to the end of the sixth step, (counting the periphery of the smallest radius of the disk as the first step,) causing the insertion of spaces of the sixth size, each eight-hundredths of an inch in thickness, which spaces are thus each five-hundredths of an inch thicker than the temporary spaces displaced, (the temporary spaces being of the same thickness as the first or thinnest size of permanent spaces—i. e., three one-hundredths of an inch,) wherefore the line would be lengthened by the justification seven times five-hundredths of an inch, or thirty-five hundredths, which was the measured shortage. It was assumed, however, that the line was thirty-eight hundredths of an inch short. This additional three-hundredths of an inch causes the disk to be rotated three-sevenths of the length of a step beyond the end of the sixth step, causing the plunger to descend upon the seventh step three-sevenths of its length from the end. The first space inserted, therefore, will be of the seventh size, or nine-hundredths of an inch thick. After its insertion the fractional spacing mechanism, as above described, causes the rotation of this disk $n^7$ in a retrograde direction one-seventh of the length of the step, and the plunger $q^{12}$ is still left upon the seventh step, (two-sevenths from the end thereof,) causing the insertion of the same-sized space for the second space in the line. After its insertion the disk is again rotated one-seventh of the length of the step, leaving the plunger one-seventh from the end of this step, but still on it. The third space will therefore be nine-hundredths of an inch thick. After the insertion of this space the disk is again rotated one-seventh of the length of a step, which causes this step to pass this time beneath the plunger, permitting the plunger to descend upon the next or sixth step, which calls for spaces eight-hundredths of an inch thick. There remain four spaces to be inserted. The three additional movements of this disk, each one-seventh of the length of a step, which will take place following the insertion of the three succeeding spaces will leave the plunger still upon the sixth step, causing the remaining spaces all to be of this same thickness. The permanent spaces thus inserted are three of nine-hundredths of an inch and four of eight-hundredths of an inch, and the temporary spaces removed are seven of three-hundredths of an inch, causing a net lengthening of the line of $3 \times .09 + 4 \times .08 - 7 \times .03$, or .38, which was the measured shortage. It will thus appear that not more than two sizes of spaces will ever be inserted in a single line, the aggregate amount of these successive rotations of the disk never exceeding the length of a step during the insertion of spaces in any one line. If it happens that the plunger rests upon a step directly adjacent to the end of the next higher step, the spaces inserted in that line will all be of the same size. Thus if there are ten spaces in such a line the stepped disk will have received before the insertion of the last space nine retrograde movements, each equal to one-tenth of the length of the step, leaving the plunger resting upon the last tenth of this step for the insertion of the last space. The friction-brake $p^{13}$, Figs. 1 and 5, acting on the smooth periphery of the disk $p^8$, holds the stepped disk $n^7$ in place when the pawls $p^3$ return. When the cam $q^{11}$, however, draws the plunger $q^{12}$ upward and the space-case to the extreme forward position during the first portion of the line-shaft's rotation, a pin $p^{15}$, projecting from the brake $p^{13}$ through a slot in the bracket $Z^2$ into a slot $q^{21}$ in the plunger $q^{12}$, causes the plunger to raise the brake out of engagement with the periphery of the disk $p^8$, the pin $p^{15}$ being engaged by the base of the slot $q^2$. This same movement causes the extreme right-hand end of the pin $p^{15}$ to engage and raise an arm $p^{16}$, Figs. 1, 5, and 17, which has a depending link $p^{17}$ carrying a projecting arm $p^{18}$ beneath the weighted ends of the pawls, and thus these pawls are drawn out of engagement with the disk $p^8$, leaving the gears N to be rotated back to their zero position by the spring $n^{11}$.

*Delivery mechanism.*—The completely-justified line was left standing across the mouth of the galley W, which is to receive it. As stated, it there remains until the line-shaft is again operated at the completion of the assemblage of the succeeding line, the delivery being accomplished by the partial rotation of the same shaft H, which turns the assemblage member to bring the newly-assembled line into alinement with the justifying-channel. As seen in Fig. 9, the shaft H extends across the machine, the rear end being carried in bearings by the frame-bracket $Z^7$. On the shaft is an upwardly-extending arm $w$, Figs. 9 and 14, which carries an adjustable extension $w'$, engaging the recess in a block $w^2$ on the under side of a plate $w^3$, which normally stands across the mouth of the galley and receives the justified line of type on its upper surface, the type being advanced thereonto against the slidable skeleton bar $s^{31}$, which originally stands with its forward end adjacent to the word-shaft trip, but moves backward as the line continually advances, as explained. The partial rotation of the shaft H swings the arm $w$ rearward, withdrawing the plate $w^3$ from beneath the line of type far enough to uncover the mouth of the galley. Further movement of this arm causes the upper end of the lever $w$ to pass out of engagement with the block $w^2$, leaving the plate standing while the arm $w^9$, Figs. 3 and 9, on the end of the shaft H engages the depending arm $w^{11}$ from a rock-shaft $w^{12}$, on which is secured the frame $w^{13}$, carrying the curved plunger $w^{14}$. This plunger is thus caused to descend and shoves the justified line of type into the galley between the stationary guide-block $w^{15}$, Fig. 1, on one side thereof and the adjustable guide-block $w^{16}$ on the other side, where it rests on the type previously delivered or, in case of the first line delivered, on the adjustable block $w^{17}$, which slidably occupies the galley and moves downward as the type is delivered. The galley rests on the inclined frame-plate $Z^8$ and is locked in place by the block $w^{21}$ on the lower end thereof. After the line is delivered the plate $w^3$ is returned to normal position, the end $w'$ of the lever $w$ swinging back into engagement with the block $w^2$ as the shaft returns to receive the next line of justified type. A spring $w^{19}$ is carried by the frame $w^{13}$ and, bearing on the top of an adjustable pin $w^{22}$ in the stationary bar $w^{24}$, brings the plunger and frame to normal position. The spring extends into an opening $w^{23}$ in the plunger $w^{14}$ to prevent it from raising the plunger farther than the required height. The pin $w^{22}$ on which the spring rests is adjustable to vary the position of the plunger for different sizes of type used.

*Leading mechanism.*—The leads, Figs. 3 and 14, are indicated by X. They occupy a box formed by the rear side of the galley-frame and the forward side of the bracket $Z^7$. The space between the two plates is closed at the forward end, but open at the rear, so that the leads may be easily inserted into the box thus provided above the plunger $x$ on the rod $x'$. This rod extends down beneath the frame and is there given an upward pressure by means of a weight (not shown) attached to a cord $x^3$, passing around the sheave $x^4$ and secured to a collar $x^5$ on the rod, the leads being thus fed up against the under side of the plate $w^3$. When the latter is withdrawn for the delivery of a line, as above described, the top lead enters the recess $w^{26}$, provided on the under side of the forward portion of this plate, and thereupon the return of this plate to normal position shoves the lead with it onto the top of the line of type just delivered.

In order to throw the leading mechanism out of action when desired, I provide a shaft $x^7$, running through the frame beneath the bed-plate Z and having on its rear end a rocker-arm $x^8$, which rocker-arm carries a weighted dog $x^9$, surrounding the rod $x'$, normally idly. When, however, a lever $x^{11}$, Fig. 12, at the forward end of the machine is depressed, the shaft $x^7$ is moved through a small portion of a rotation and the forward end of the rocker-arm swung downward, which causes the dog (which is held horizontal by engaging the under side of the bed-plate) to grip the rod $x'$, and thus draw it downward sufficiently to bring the leads out of position to be engaged by the plate $w^3$.

I claim—

1. In a justifying mechanism, the combination with a set of temporary spaces of a thickness equal to the thinnest size of permanent spaces used, of a space-case containing a series of permanent spaces graded in respect to thickness, means for measuring the amount which a line of type with some of said temporary spaces interspersed is less than the column width, means for taking account of the number of such temporary spaces, mechanism for selecting the space in the space-case to be employed, and a rotatable engageable cone for varying such selecting mechanism, and mechanism whereby one of said means selects a certain periphery of the cone for action and the other of said means rotates such periphery.

2. In a justifying mechanism, in combination, a stepped member whose steps are of different total height, a connection between the same and permanent spaces whereby a certain space is selected according to which step of the member is in engagement with the coöperating member, a series of gears of various radii adapted to move said stepped member relative to the member engaging its steps according to the angular rotation of said gears, means for determining which gear is to be in action according to the number of spaces in the line, and means for giving the periphery of such gear a movement according to the line's variation from the required length.

3. In a justifying mechanism, in combination, a stepped disk whose steps are of different total height, a connection between the same and permanent spaces whereby a certain space is selected according to the step of the disk which is in action, an engageable cone adapted to rotate said disk, means for bringing a certain periphery of said cone into action according to the number of spaces in a line, and means for moving such periphery according to the line's variation from the required length.

4. In a justifying mechanism, in combination, a rotatable shaft, a series of overlapping gears thereon, a stepped disk adapted to be rotated according to the rotation of said shaft, a space-case containing permanent spaces, a connection between the same and the steps of said disk, means for selecting the gear which is to be in action and for moving the periphery of said gear a definite amount, according to the number of spaces in the line and the line's variation from the required length.

5. In a justifying mechanism, in combination, a rotatable shaft, a series of overlapping gears thereon, a stepped block adapted to be moved according to the rotation of said shaft, a space-case containing permanent spaces, a connection between the same and the steps of said block, means for selecting the gear which is to be in action and for moving the periphery of said gear a definite amount, according to the number of spaces in the line and the line's variation from the required length, and means for returning the gears to a zero position.

6. In a justifying mechanism, in combination, a series of gears of varying radii, a rack adapted to drive any of said gears, means for shifting the rack laterally according to the number of spaces in the line to be justified and thereby determine which gear is to be engaged by the rack, and means for shifting the rack longitudinally according to the line's variation from the required length, and means for determining the size of permanent space according to the movement of the gear.

7. In a justifying mechanism, in combination, a rack, means for moving the same according to the measurement of the line, a series of gears adapted to be driven by said rack, means for selecting the gear to be driven according to the number of spaces in the line, a stepped block, means for carrying different sizes of permanent spaces and a connection between such carrying means and the steps of said block.

8. In a justifying mechanism, a series of gears of various radii, means for selecting the gear which is to be in action and for moving the periphery of said gear a definite amount, according to the number of spaces in the line and the line's variation from the required length, and means for rotating the gears to a zero position.

9. In a justifying mechanism, in combination, a series of gears continuously overlapping, a rack for coöperation with any of said gears, means for causing relative movement between the gears and rack in the direction of the axis of the gears, said movement being limited by the side of the rack contacting with the face of the gear next larger than the one engaged by the rack, mechanism for moving the rack, and space-selecting mechanism operated by the gears.

10. In a justifying mechanism, in combination, means for measuring the line, means for taking account of the number of spaces therein, a rack, means for shifting the same laterally according to one of said measurements and longitudinally according to the other, a series of gears, means for causing said rack to connect with one of such series according to its lateral movement, and drive that gear according to the rack's longitudinal movement, and mechanism for determining the permanent space to be in the justified line governed by the rotation of such gear.

11. In a justifying mechanism, in combination, a rack, means for moving it according to the number of spaces in the line, a series of gears of various radii, one of which is caused to engage said rack and be moved thereby according to the line's variation from the required length and thereby rotating said gear accordingly, a stepped block moved according to the rotation of said gear, and means for carrying a series of permanent spaces individually selected by the step of the block which is in action.

12. In a justifying mechanism, in combination, a rack, means for moving the same laterally according to the number of spaces in the line, means for moving the same longitudinally according to the line's variation from the required length, a cone of gears, means for returning said gears to a zero position, means for moving the rack until one of them engages therewith, and mechanism for selecting the permanent space according to the rotation of such gears by said rack.

13. In a justifying mechanism, in combination, a rack, means for moving the same laterally according to the number of spaces in the line, means for moving the same longitudinally according to the line's variation from the required length, a cone of gears, means for giving said gears a tendency to return to a zero position, means for moving said gears in a body across the rack until one of them engages therewith, mechanism for selecting the permanent space according to the rotation of such gears, and a brake for holding the gears in whatever position they may be.

14. In a justifying mechanism, in combination, a rack, means for moving it longitudinally according to the line's measurement, means for shifting it laterally according to the number of spaces in the line, a series of gears of various radii, means whereby one of said gears is caused to be driven by said rack according to its lateral position and longitudinal movement, a stepped disk rotatable with said gears, a plunger engaging a step of said disk, a space-case containing permanent spaces, and a connection between the same and said plunger.

15. In a justifying mechanism, in combination, a rotatable shaft, a series of gears of various radii rigid thereon, a stepped disk splined on said shaft, a plunger engaging the periphery of said disk, a space-case containing permanent spaces graded in respect to thickness, a connection between the same and said plunger, a rack, means for moving the same laterally to a position determined by the number of spaces in the line, means for shifting said series of gears until one of them engages the rack, and means for moving said rack longitudinally according to the measurement of the line.

16. In a justifying mechanism, in combination, a stepped selecting-block, mechanism adapted to engage the steps thereof and determine the size of permanent spaces to be in the justified line, a series of gears of varying radii and rigid with each other whose rotation is adapted to change the position of said block relative to its connection with the permanent spaces, means tending to bring said series of gears to a zero position and means for holding said series of gears in whatever position they may be, means for selecting a certain gear for action according to the number of spaces in the line, and means for moving the periphery of such gear according to the line's variation from the required length.

17. In a justifying mechanism, in combination, a wedge adapted to move until stopped by compacting the line, a series of gears, means for selecting for action one of said gears according to the number of spaces in the line, and means for moving the periphery of such selected gear according to the movement of said wedge, and mechanism for determining the size of permanent space to be in the justified line according to the rotation of said selected gear.

18. In a justifying mechanism, in combination, a wedge adapted to move until stopped by compacting the line, a rack adapted to be moved longitudinally by said wedge, a series of gears any of which may be driven by said rack, means for selecting the gear so as to be driven according to the number of spaces in the line, and means governed by the rotation of such gear for selecting the permanent space to be in the justified line.

19. In a justifying mechanism, in combination, means for holding a line of type and interspersed temporary spaces, a wedge adapted to move across the line until stopped by compacting it, a rack adapted to be moved by said wedge, a series of gears one of which is engaged by said rack prior to the movement of the wedge, means for taking account of the number of spaces in the line and determining accordingly the gear which will be so engaged, and means governed by the rotation of the gear for determining the size of permanent space in the line.

20. In a justifying mechanism, in combination, a wedge, means for causing the same to move until stopped by compacting a line of type, a rack moved longitudinally by such movement of said wedge, means for moving said rack laterally according to the number of spaces in the line, a cone of gears, means for moving said cone until one of the gears comes into connection with the rack according to the position of the latter, and means for determining the size of permanent space to be in a justified line according to the rotation of such gear.

21. In a justifying mechanism, in combination, a wedge, means for moving the same until stopped by compacting a line of type, a rack movable longitudinally according to the movement of said wedge, a series of gears of varying radii, means for moving said series to bring a certain gear into connection with the rack whereby such selected gear is rotated according to the movement of the wedge, means for holding such selected gear in its then position while the wedge returns, and means for determining the size of permanent spaces according to the rotation of such gear.

22. In a justifying mechanism, in combination, a wedge, means for moving the same until stopped by compacting a line of type, a rack movable longitudinally according to the movement of said wedge, a cone of gears, means for moving said cone to bring a certain gear into connection with the rack whereby such selected gear is rotated according to the movement of the wedge, means for holding the cone in its then position while the wedge returns, means for determining the size of permanent spaces according to the rotation of such cone, and means for returning said cone to its zero position after the justification.

23. In a justifying mechanism, in combination, a stepped selecting-block, mechanism adapted to engage the steps thereof and thereby determine the size of permanent spaces to be in the justified line, a series of gears of varying radii and rigid with each other whose rotation is adapted to change the position of said block relative to its connection with the permanent spaces, means tending to bring said series of gears to a zero position, a brake for holding said series of gears in whatever position they may be, a wedge, means for moving it until stopped by compacting the line of type, means movable according to the movement of said wedge to rotatably engage one of said gears, and means for selecting the gear so to be engaged according to the number of spaces in the line.

24. In a justifying mechanism, in combination, a stepped selecting-block, mechanism adapted to engage the steps thereof and thereby determine the size of permanent spaces to be in the justified line, a series of gears of varying radii and rigid with each other whose rotation is adapted to change the position of said block relative to its connection with the permanent spaces, means tending to bring said series of gears to a zero position, a brake for holding said series of gears in whatever position they may be, a rack adapted to drive any of said series of gears, means for shifting said rack laterally according to the number of spaces in the line, means for shifting said series of gears to cause one of them to engage the rack according to the position of the latter, a wedge, means for moving it until stopped by compacting the line of type, means whereby such movement of the wedge is communicated to the rack when in engagement with the gear.

25. In a justifying mechanism, in combination, a wedge guided in its inclined edge whereby as it moves longitudinally it moves laterally also, a toothed rack guided parallel with the longitudinal movement of said wedge, a connection between the rack and wedge whereby the rack is moved according to the longitudinal movement of the wedge but not its lateral movement, means for moving the rack laterally according to the number of spaces in the line, and space-selecting mechanism adapted to be connected with the teeth of the rack and governed by the lateral position and longitudinal movement of the rack.

26. In a justifying mechanism, in combination, a wedge, guided on its inclined edge whereby as it moves longitudinally it moves laterally also, a rack guided parallel with the longitudinal movement of said wedge, a connection between the rack and wedge whereby the rack is moved according to the longitudinal movement of the wedge but not its lateral movement, means for moving the rack laterally according to the number of spaces in the line, a series of gears one of which is adapted to engage said rack according to its lateral position and be moved by it according to its longitudinal movement, and mechanism for determining the size of permanent space to be in a justified line according to the rotation of said series of gears.

27. In a justifying mechanism, in combination, a plate, means for moving the same laterally according to the number of spaces in the line, a rack carried by said plate and guided to be movable crosswise of the movement of the plate, a cone of gears, means for moving the same toward the plane of the movement of said plate to cause a gear to engage said rack according to its position, means for moving the rack longitudinally according to the measurement of the line, and means for determining the size of permanent space according to the rotation of such selected gear.

28. In a justifying mechanism, in combination, a plate, means for moving the same edgewise according to the number of spaces in the line, a rack carried by said plate and guided thereby to be moved in the plane of the plate, a series of overlapping gears, means for moving the same toward the plane of the plate until stopped by some gear impinging the side of the rack, the next smaller gear engaging the rack, means for moving the rack longitudinally when in such engagement according to the line's variation from required length, and mechanism for determining the size of permanent space according to the movement of said gear.

29. In a justifying mechanism, in combination, a plate, means for moving the same edgewise according to the number of spaces in the line, a rack carried by said plate and guided thereby to be moved in the plane of the plate, a series of overlapping gears, means for moving the same toward the plane of the plate until stopped by some gear impinging the side of the rack, the next smaller gear engaging the rack, a wedge adapted to move across the line of type until stopped by compacting the same, a connection between said wedge and said rack whereby the rack while engaging its gear is moved according to the movement of the wedge, means for retaining the gear in its then position when the wedge returns, and mechanism for governing the size of permanent space according to the rotation of such gear.

30. In a justifying mechanism, in combination, a plate, means for moving the same according to the number of spaces in the line, a rack carried by said plate, a series of gears rigid with each other, means tending to rotate said gears back to a zero position, means for shifting the series of gears when in the zero position into engagement with the rack, means for then moving the rack according to the line's variation from required length, a brake for retaining the series of gears in the then position, a stepped disk rotated by said series of gears, a plunger engaging a step of said disk, and a space-case connected with said plunger.

31. In a justifying mechanism, in combination, a shiftable block, means for moving the same step by step according to the number of spaces in the line, a shiftable plate, a stationary rack, two pawls carried by said plate and connected together, means for shifting said plate until one pawl is moved by said block to move the other pawl into engagement with said rack, thereby stopping the plate according to the position of said block.

32. In a justifying mechanism, in combination, a space-key, a movable pawl operated thereby, a stationary pawl, a toothed block adapted to be moved by the movable pawl and held against return by the stationary pawl, a shiftable plate, a stationary rack, a pawl carried by said plate and adapted to engage said rack, means for shifting said plate, and means for causing the pawl carried thereby to be moved into engagement with said stationary rack according to the position of said shiftable block whereby the plate becomes locked, and means for thereafter automatically releasing said movable and stationary pawls to allow the return of said movable block.

33. In a justifying mechanism, in combination, a shiftable plate, a pair of pawls carried thereby and movable crosswise of the plate, a lever connecting said two pawls, a stationary rack, a shiftable block, means for moving said plate to cause one of the pawls to engage an incline on said block and thereby move the other pawl into engagement with the stationary rack.

34. In a justifying mechanism, in combination, a space-case containing spaces graded in respect to thickness, a stepped disk, a connection between the stepped surface thereof and said space-case, means for giving said disk an initial position dependent on the number of spaces in the line and the line's variation from the required length, and means for periodically during the justification of the line giving said stepped disk a portion of a rotation whose angular distance is proportionate to the reciprocal of the number of spaces in the line.

35. In a justifying mechanism, in combination, a space-case containing spaces graded in respect to thickness, a stepped disk, a connection between the stepped surface thereof and the space-case, means for giving said disk an initial position dependent on the number of spaces in the line and the line's variation from the required length, a second disk rotating with the stepped disk and having teeth on its periphery, a plunger carrying a pawl engaging the teeth on said second disk, and means for moving said plunger an amount proportional to the reciprocal of the number of spaces in the line, whereby a corresponding angular movement is given to said stepped disk.

36. In a justifying mechanism, in combination, a stepped selecting-block, a connection between the same and a series of permanent spaces graded in respect to thickness, mechanism for moving the block relative to the part of said connection which engages its steps periodically during the justification of the line, the movement governed by impingement against one of a series of steps whose distance from a given datum-line constitutes a harmonic series.

37. In a justifying mechanism, in combination, a block having series of steps whose distances from a given datum-line constitute a harmonic series, a stepped member, a space-case connected therewith, and mechanism for moving the stepped member relative to its connection with the space-case, which mechanism is governed by the step of the block which is in action.

38. In a justifying mechanism, in combination, a stepped selecting-block, a connection between the stepped surface thereof and a series of permanent spaces graded in respect to thickness, a plunger connected with said block, mechanism for causing the plunger to move the block periodically during the justification of the line, another stepped block the distance of whose steps from a given datum-line constitutes a harmonic series, said last-mentioned block governing the movement of said plunger.

39. In a justifying mechanism, in combination, a stepped block, the distances of whose steps from a given datum-line constitute a harmonic series, a plunger, means independent of said block for moving said plunger from a zero position until stopped by engaging one of said steps, means for changing the relative position of the plunger and such block according to the number of spaces in the line whereby the movement of the plunger is proportional to the reciprocal of said number, and space-selecting mechanism varied during the justification of the line by the movements of said plunger, which movements accumulating may cause the selection of a different-size space.

40. In a justifying mechanism, in combination, two sets of steps, the distances from the treads to a given datum-line in one set constituting an arithmetic series, and in the other set a harmonic series, a connection between the arithmetic series of steps and the permanent spaces to be in the justified line, mechanism operating periodically during the justification of a line whose movement is determined by that step of the harmonic series which is in action, means operated by such mechanism for changing the position of the arithmetic series relative to the member engaging its steps, and mechanism for determining which step of the harmonic block is in action according to the number of spaces in the line.

41. In a justifying mechanism, in combination, two stepped blocks, the distance from the steps to a given datum-line on one block constituting an arithmetic series, and on the other block a harmonic series, a connection between the arithmetic series of steps and the permanent spaces to be in the justified line, mechanism operating periodically during the justification of a line whose movement is determined by the step of the harmonic block which is in action, a connection between such mechanism and the arithmetic block, and mechanism for determining which step of the harmonic block is in action according to the number of spaces in the line.

42. In a justifying mechanism, in combination, a stepped member, a space-case containing spaces graded in repect to thickness, a connection between the same and the steps of said member, a stepped block the individual rises of whose steps form the corresponding terms of a series, each term of which has a numerator of unity and a denominator consisting of the product of the number of the term multiplied by one more than the number of the term, means for bringing into action a certain step of said block according to the number of spaces in the line, and means for periodically moving said member relative to its connection with the space-case according to the step of said block which is in action.

43. In a justifying mechanism, in combination, a stepped block, the distance of whose steps from a given datum-line constitute a harmonic series, means for shifting said block according to the number of spaces in the line, a stepped selecting-block, a space-case for permanent spaces, the rises of said selecting-block being dependent on the distances between the centers of consecutive channels in the space-case, a connection between such space-case and the steps of such selecting-block, means for causing a periodic movement during the justification of the line of the selecting-block relative to its connection with the space-case which movement is dependent upon that step of the harmonic block which is in action.

44. In a justifying mechanism, in combination a series of steps and a member between which there is a relative movement limited by their coengagement, and means independent of such series of steps for causing such movement, the amounts of such movement for consecutive steps constituting a harmonic series.

45. In a justifying mechanism, in combination, a stepped member, a connection between same and permanent spaces to be in the justified line, a stepped block whose individual rises constitute a series, each term of which has a numerator of unity and a denominator consisting of the product of the number of the term multiplied by one more than the number of the term, means for bringing a step of said block into action according to the number of spaces in the line, a plunger movable for each space inserted until stopped by its engagement with said block, and a ratchet-and-pawl connection between said plunger and said stepped member.

46. In a justifying mechanism, in combination, a stepped member, a connection between same and permanent spaces to be in the justified line, a stepped block of the character herein described, means for bringing a step of said block into action according to the number of spaces in the line, a plunger movable for each space inserted until stopped by its engagement with said block, a toothed disk whose rotation is adapted to move said stepped member relative to its connection with the permanent spaces and pawl carried by said plunger and adapted to engage the teeth of said disk.

47. In a justifying mechanism, in combination, a stepped disk, a connection between the same and permanent spaces to be in the justified line, a friction-brake for retaining said disk in whatever position it is left, a stepped block, the distances of whose steps from a given datum-line constitute a harmonic series, means for bringing a step of said block into action according to the number of spaces in the line, a plunger movable for each space inserted in the line until stopped by the engagement of said harmonically-stepped block, and a rotative connection between said plunger and said stepped disk.

48. In a justifying mechanism, in combination, a stepped disk, a space-case connected with the stepped surface thereof, a toothed surface rotating with the stepped disk, a plunger, a stepped block in the path of the plunger for limiting its movement, and a connection between said plunger and said teeth.

49. In a justifying mechanism, in combination, a stepped disk, a space-case, a connection between the same and the steps of said disk, a plunger, a stepped block adapted to be engaged by said plunger and determine its movement, a toothed disk rigid with the stepped disk, and a pawl carried by said plunger and adapted to engage the teeth on said toothed disk.

50. In a justifying mechanism, in combination, a stepped disk, another disk rotatable therewith and having fine ratchet-teeth on its periphery, a plunger, a series of verniered pawls carried thereby and adapted to engage said teeth, and a stepped block in the path of the said plunger for determining its movement.

51. In a justifying mechanism, in combination, a stepped disk, another disk rotatable therewith and having fine ratchet-teeth on its periphery, a plunger, a series of verniered pawls carried thereby and adapted to engage said teeth, a stepped block in the path of said plunger for determining its movement, a space-case, and a connection between the same and the steps of said disk.

52. In a justifying mechanism, in combination, a stepped disk, a plunger engaging a step thereof, a space-case connected with the plunger, a toothed disk rotatable with said stepped disk, pawls engaging said toothed disk, means for giving said pawls an intermittent movement during the justification to rotate said disk, means for throwing out of action said plunger and pawls, and means for then rotating the disks an amount dependent upon the line's variation from required length of spaces in the line.

53. In a justifying mechanism, in combination, a stepped disk, a plunger engaging a step thereof, a space-case connected with the plunger, a toothed disk rotatable with the stepped disk, a pawl engaging said toothed disk, a brake for holding said toothed disk in position, means for periodically during the justification moving said pawl to rotate the disks, and means operating once for each line justified for moving out of action said plunger, pawl and brake.

54. In a justifying mechanism, in combination, a space-case, a stepped disk, a connection between the same, a toothed disk connected with said stepped disk, a pawl engaging said toothed disk, means for operating said pawl to move said disk, said pawl having several teeth whereby it presents a rack engagement to said disk and rotates it through an angular distance whose arc on the pitch-circle of said teeth is equal to the movement of the pivot of said pawl.

55. In a justifying mechanism, in combination, a stepped disk, a toothed disk rotatable therewith, a pawl engaging the teeth thereof, a plunger carrying said pawl, a stepped block in the path of said plunger.

56. In a justifying mechanism, in combination, a stepped disk, a toothed disk rotatable therewith, a pawl engaging the teeth thereof, a plunger carrying said pawl, a stepped block in the path of said plunger, the steps of said block being arranged so that their distance from a given datum plane constitutes a harmonic series, and means for bringing into action that step of the series whose distance from the said datum-line is represented by the reciprocal of the number of spaces in the line.

57. In a justifying mechanism, in combination, a stepped disk, a space-case connected with the stepped surface thereof, a toothed disk rigid with said stepped disk, a plunger a pawl carried thereby for engaging said toothed disk, a shaft rotated once for each space justified, a spring actuating said plunger in the effective direction, a cam on said shaft actuating the plunger in the opposite direction, a stepped block in the path of said plunger limiting its movement in the effective direction, and means for shifting said block according to the number of spaces to be justified.

58. In a justifying mechanism, in combination, a stepped member, a space-case, a connection between the same and the stepped surface of said member, a rotatable toothed disk adapted to move said stepped member relative to its connection with the space-case, a link, a pawl carried thereby, a spring for moving said link to cause the pawl to rotate the toothed disk, a shaft rotated once for each space to be justified, a cam on said shaft to move said link in the opposite direction, an adjustable projection carried by said link, a stepped block in the path of said adjustable projection, and means for shifting said block to cause that step which corresponds to the number of spaces in the line to be in the path of the projection.

59. In a justifying mechanism, in combination, selecting mechanism, a rotatable disk adapted in its movement to vary the same, said disk having fine teeth, a link actuated for each space to be justified, a series of verniered pawls carried by said link for rotating said disk, an adjustable projection carried by the link, and a stepped block with which such projection may engage, the distances of the steps of said block from a datum plane which is coincident with the zero position of the face of said projection constituting a harmonic series, and mechanism for shifting said block to bring a step into action which corresponds to the reciprocal of the number of spaces in the line.

60. In a justifying mechanism, in combination, a rotatable stepped disk, a space-case, a plunger, a shaft rotatable once for each line to be justified, a cam on said shaft, and a system of levers and links connecting said cam, said space-case and said plunger, whereby the step engaged by said plunger determines the position of said space-case but said cam may cause said plunger to move out of engagement with said stepped disk, and mechanism for rotating said stepped disk by an amount depending on both the line's variation from required length and number of spaces in the line while said plunger is held out of action.

61. In a justifying mechanism, in combination, a rotatable cone of gears, a stepped selecting-block connected to be moved according to the rotation of the cone, means for selecting for action one of said gears dependent upon the number of spaces in the line, means for giving such selected gear a peripheral movement dependent upon the line measurement, means for thereafter during the justification of the line giving said stepped block a periodic movement which is such portion of a step thereon as is represented by the reciprocal of the number of spaces to be justified.

62. In a justifying mechanism, in combination, a shaft, a series of gears drivingly mounted thereon, a stepped selecting-block adapted to be moved by the rotation of the shaft, means for selecting for action one of said gears dependent upon the number of spaces in the line, means for giving such selected gear a peripheral movement dependent upon the line measurement, a plunger adapted in its movement to rotate said shaft, a stepped block for limiting the movement of said plunger, and means for changing the step of the block which said plunger engages according to the number of spaces in the line.

63. In a justifying mechanism, in combination, a series of gears, a stepped disk rotatable therewith, means for selecting for action one of said gears dependent upon the number of spaces in the line, means for giving such selected gear a peripheral movement dependent on the line measurement, a plunger adapted in its movement to rotate said disk, a stepped block for limiting the movement of said plunger, means for changing the step of the block which said plunger engages according to the number of spaces in the line, a case containing a series of permanent spaces graded in respect to thickness, and a connection between the same and the stepped surface of the stepped disk.

64. In a justifying mechanism, in combination, a cone of gears rigid with each other, a stepped selecting member movable according to the rotation of said cone of gears, a space-case, a connection between the same and the stepped surface of the selecting member, a plunger, a ratchet connection between the same and said selecting member, a stepped block in the path of the plunger limiting its movement, and mechanism for selecting for action one of said gears according to the number of spaces in the line for giving said stepped block a movement according to the number of spaces in the line, for moving such selected gear a peripheral distance according to the line's variation from required length, for alternately placing such selected space in the line and moving said plunger until it engages said stepped block.

65. In a justifying mechanism, in combination, an engageable cone, means for selecting for action a certain periphery thereof, means for giving said selected periphery a movement according to the line measurement, a stepped disk rotated by said cone, a space-case, a connection between the same and the steps of said disk, a toothed disk rotatable with said stepped disk, a stepped block, a plunger adapted to engage the same, a pawl carried by said plunger and engaging said toothed disk, and mechanism for throwing out of action once for each line the pawl and the connection between the stepped disk and the space-case.

66. In a justifying mechanism, in combination, a rack, means for shifting the same laterally according to the number of spaces in the line, means for moving it longitudinally according to the line's variation from the required length, a series of overlapping gears rigid upon a shaft, means for moving said shaft until one of said gears comes into engagement with said rack, a stepped block having steps corresponding to the various number of spaces in the line, a connection between the same and said shaft whereby the block is shifted according to the number of spaces in the line, a plunger adapted to move until it is stopped by engaging with said block, mechanism connected with the plunger whereby it rotates said shaft, and selecting mechanism governed by said shaft.

67. In a justifying mechanism, in combination, a rack, means for shifting the same laterally according to the number of spaces in the line, means for moving it longitudinally according to the line's variation from the required length, a series of overlapping gears rigid upon a shaft, means for moving said shaft until one of said gears comes into engagement with said rack, a stepped block having steps corresponding to the various number of spaces in the line, a connection between the same and said shaft whereby the block is shifted according to the number of spaces in the line, a plunger adapted to move until it is stopped by engaging with said block, a stepped disk, and a toothed disk rigid with each other and splined upon said shaft, a pawl connecting said plunger with said toothed disk, a series of permanent spaces, and a connection between the same and the steps of said stepped disk.

68. In a justifying mechanism, in combination, a rack, means for shifting the same laterally according to the number of spaces in the line, means for moving it longitudinally according to the line's variation from the required length, a series of overlapping gears rigid upon a shaft, means for moving said shaft until one of said gears comes into engagement with said rack, a stepped block of the character herein described, a connection between said block and said shaft whereby the block is shifted according to the number of spaces in the line, a plunger adapted to move until it is stopped by engaging with said block, a stepped disk, and a toothed disk rigid with each other and splined upon said shaft, and pawls connecting said plunger with said toothed disk, a frictional brake engaging a smooth surface rigid with said stepped disk and said toothed disk, a space-case, and a connection between the same and the steps of said stepped disk.

69. In a justifying mechanism, in combination, a rack, a series of gears of varying radii any of which is adapted to mesh therewith, means for moving said rack laterally according to the number of spaces in the line, means for then moving said gears to cause the corresponding gear to mesh with the rack, a stepped block shiftable with said gears to bring the corresponding step into action, mechanism for measuring the line's variation from the required length and moving said rack longitudinally accordingly and thereby rotating said gears, a stepped disk rotatable with said gears, a space-case, a connection between the same and a step of said disk, a plunger adapted to engage said stepped block, a connection between said plunger and said stepped disk whereby the plunger may rotate the disk an amount dependent on the number of spaces, means for placing the selected space in the line, and means for moving said plunger periodically during the justification.

70. In a justifying mechanism, in combination, a rack, a series of gears of varying radii any of which is adapted to be in connection with said rack, a stepped block shiftably connected with said gears, means for shifting said rack laterally according to the number of spaces in the line, means for shifting the gears and block until one of the gears engages said rack, means for measuring the line's variation from required length and moving said rack longitudinally accordingly, a stepped selecting member movable according to the rotation of said gears, a plunger, means for moving the same until stopped by engaging a step on said block, a connection between said plunger and said stepped selecting member, a series of permanent spaces graded in respect to thickness, a connection between the same and said selecting member, means operating once for each line to move the rack, gears, and stepped block as stated, and means operating once for each space to place a permanent space in the line and to move the plunger.

71. In a justifying mechanism, in combination, a shaft, a series of gears rigid thereon, a stepped disk splined on said shaft, another disk rigid with said stepped disk, said other disk having teeth on its periphery and having a smooth peripheral portion, a brake bearing on said smooth portion, a plunger, a pawl carried thereby engaging said teeth, a stepped block shiftable with said gears and shaft and standing in the path of said plunger.

72. In a justifying mechanism, in combination, a shaft, a series of gears rigid thereon, a stepped disk rotatable with said shaft, another disk rotatable with said stepped disk, said other disk having teeth on its periphery and having a smooth peripheral portion, a brake bearing on said smooth portion, a plunger, a pawl carried thereby engaging said teeth, a stepped block shiftable with said gears and shaft and standing in the path of said plunger, a spring tending to return said gears and disks to a zero position, and means actuated once for each line disengaging said brake and allowing said gears to so return.

73. In a justifying mechanism, in combination, a rotatable assemblage member having a series of radially-placed channels for receiving the assembled line, means for rotating said member to bring the assembled line into justifying position, one wall of each channel being made by a strip adjustably held with reference to the other wall whereby the channels may be adjusted for different fonts of type.

74. In a justifying mechanism, in combination, a rotatable assemblage member having a plurality of radial arms, each arm having on one side a projection, an angle-strip seating on said projection and defining a channel between it and the face of the arm, said angle-strip being adjustably clamped to said projection whereby said channel is adjustable.

75. In a justifying mechanism, in combination, a rotatable assemblage member having a plurality of radial arms, each arm having on one side a projection, an angle-strip seating on said projection and defining a channel between it and the face of the arm, said angle-strip being adjustably clamped to said projection whereby said channel is adjustable, and a graduated scale between said projection and angle-strip and visible through an opening in one of said parts, said scale being guided to slide longitudinally on one of said parts, and having an inclined connection with the other whereby as the scale is moved longitudinally the angle-strip may be shifted in or out.

76. In a justifying mechanism, in combination, a rotatable assemblage member having a plurality of radial arms, each arm having on one side a projection, an angle-strip seating on said projection and defining the channel between it and the face of the arm, there being formed a longitudinal groove in said projection, a graduated scale occupying said groove and visible through an opening in said angle-strip, pins and inclined grooves carried by said scale and said angle-strip, and means for adjustably holding said angle-strip in place.

77. In a justifying mechanism, in combination, an assemblage member having a series of radially-placed channels for receiving an assembled line of type, means for rotating said member to transfer said line of type, follower-blocks adapted to stand one in each channel, there being a longitudinal groove in the side of each channel and a corresponding rib on the side of the follower-block whereby the follower may be held in the channel when it rotates through the lower portion of its circuit but may be drawn out of the channel longitudinally.

78. In a justifying mechanism, in combination, an assemblage member having a series of radially-placed channels adapted to receive a line of type, mechanism for rotating said member to turn the channel through a portion of a rotation into position for justification, mechanism for then compacting the line against a suitable stop, said stop being adjustable but rigidly carrying a stop for the preceding assemblage-channel, whereby one adjustment serves for both the line being assembled and the line being justified.

79. In a justifying mechanism, in combination, an assemblage member having a series of radially-placed channels adapted to receive a line of type, mechanism for rotating said member to turn the channel through a portion of a rotation into position for justification, mechanism for then compacting the line against a suitable stop, said stop consisting of a bar having a curved arm extending circularly upward through a slot in the preceding justifying-channel, whereby said bar not only serves as a stop against which the line is measured but serves as a stop for the prior setting of that line and for holding it in the channel during the transfer, and means for adjusting the position of said bar.

80. In a justifying mechanism, in combination, an assemblage member having a plurality of radial channels adapted to receive a line of type being assembled, a shaft, means for giving said shaft a partial rotation, a connection between the said shaft and assemblage member whereby such rotation turns the assemblage member to bring the line of type assembled into the justified line, means for delivering the previously-justified line, and a connection between said delivering means and said shaft whereby the same movement delivers the previously-justified line.

81. In a justifying mechanism, in combination, a justifying-channel, means for advancing a line of type along said channel, means for replacing temporary spaces which are in the line by permanent spaces during such advancement, a galley, a receiving-bar occupying said channel and extending across said galley and adapted to have the type bear against it and force it rearward as the type is advanced, and means for giving said bar a tendency to return forward.

82. In a justifying mechanism, in combination, a justifying-channel, means for advancing the line of type and temporary spaces intermittently along the same, means for replacing the temporary spaces by permanent spaces during such advancement, mechanism engaged by the forward end of the line and fed along as the line is advanced, means tending to return said mechanism to its forward position, a dog adapted to retain said line and mechanism at the extreme position when the line-advancing mechanism ceases to operate.

83. In a justifying mechanism, in combination, a justifying-channel, means for advancing a line of type and temporary spaces along the same, means for substituting permanent spaces for the temporary spaces, a trip adapted to extend into the type-channel and actuate such substituting mechanism, a skeleton-like receiving-bar occupying said channel and having a pair of projecting arms which lie on opposite sides of the trip, and means for giving said bar a tendency to move forward.

84. In a justifying mechanism, in combination, a justifying-channel consisting of a groove in a plate of sufficient width and depth to receive a line of type on its side, an additional groove along one side of the justifying-channel, a plate forming the top of the justifying-channel and having a downwardly-extending rib occupying said additional groove whereby said top plate may be adjusted toward or from the channel and still keep it closed.

85. In a justifying mechanism wherein there is employed a compacted line of type and a thin temporary space having a notch in it, mechanism adapted to automatically enter said notch and move therein to form a gap for the insertion of a larger space.

86. In a justifying mechanism, in combination, means for advancing a compacted line of type and temporary spaces which have notches in them, means for substituting permanent spaces for such temporary spaces, and means adapted to enter the notch in the temporary space as it comes to the substitution-point and by moving therein form a gap in the line.

87. In a justifying mechanism, in combination, means for advancing a compacted line of type and temporary spaces having notches in them, means for substituting one by one permanent spaces for the temporary spaces, a pivoted dog whose nose enters the notch in which temporary space as it comes to the substitution position, and means for turning said dog on its pivot while in said notch to form a gap in the line.

88. In a justifying mechanism, in combination, a justifying-channel, means for feeding a line of type and temporary spaces along the same, means for replacing the temporary spaces by permanent spaces, a trip for actuating such replacement, said trip being adapted to extend into an opening in the temporary space in the line and be advanced by the advancement of the succeeding type, said trip carrying a pivoted dog adapted to extend into a notch in the temporary space, and means for moving said dog when in said engagement to separate the line at this point to allow the insertion of a larger size permanent space.

89. In a justifying mechanism, in combination, a justifying-channel, means for feeding a line of type along the same, a space-case containing a series of spaces graded with respect to thickness and arranged on their flat sides in consecutive channels, a space-turner consisting of a rotatable barrel, means for ejecting the permanent space from the space-case into the turner, and then turning it ninety degrees and then injecting it into the line, and means operated by said space-turner to form a gap in the line for the reception of the permanent space.

90. In a justifying mechanism, in combination, a justifying-channel, a shiftable space-case adjacent thereto and carrying a series of spaces graded in respect to thickness, means for forming a gap in a line of type held in the justifying-channel, and means for varying the size of said gap according to the position of said space-case whereby the size of the gap corresponds to the size of the space to be inserted.

91. In a justifying mechanism, in combination, a space-case, a space-turner adjacent thereto, a rack for turning said space-turner, ejecting mechanism for ejecting a permanent space from the space-case into the turner and then into the line, a trip for initiating said ejecting mechanism, said trip being adapted to extend into a notch in a temporary space in a line of compacted type and temporary spaces, a pivoted dog carried by said trip and also adapted to extend into said notch, a lever for swinging said dog, said lever being governed by the rack which moves the space-turner.

92. In a justifying mechanism, in combination, a space-turner adapted to receive a permanent space and turn it ninety degrees, consisting of a barrel having a peripheral groove, a spring-pressed dog extending into said groove, a follower in the barrel engaging said dog whatever the position of the turner.

93. In a justifying mechanism, in combination, a space-turner consisting of a barrel rotatable ninety degrees, a kerf in said barrel, a follower occupying said kerf, and a spring-pressed dog outside of the barrel, against which dog said follower moves but with which it always remains in engagement.

94. In a justifying mechanism, in combination, a justifying-channel, means for advancing a line of type along the same, a galley-support adapted to carry a galley for receiving the justified line, a plate across the mouth of the galley adapted to receive said line, a shaft, an arm carried thereby, said arm engaging said plate to withdraw it from beneath the type, and the arm thereafter being released from said plate and continuing its movement idly, said shaft in such idle movement performing another operation of the machine.

95. In a justifying mechanism, in combination, a support for a galley, a plate extending across the mouth thereof, and adapted to receive a justified line of type, means for withdrawing said plate, a plunger adapted to descend on the type when the plate is withdrawn and shove it into the galley-opening, a spring for returning said galley-plunger, said spring bearing upon an adjustable stop whereby the amount of the return of the plunger may be varied for different fonts of type.

96. In a justifying mechanism, in combination, a support for a galley, a plate extending across the mouth thereof, and adapted to receive a justified line of type, means for withdrawing said plate, a plunger adapted to descend on the type when the plate is withdrawn and shove it into the galley-opening, a spring for returning said galley-plunger, said spring being a flat spring and secured at one end to the plunger-arm and at the other extending into an opening in the plunger and passing intermediately across an adjustable screw whereby the amount of return of the plunger may be accurately adjusted for different fonts of type.

97. In a justifying mechanism, in combination, a rod adapted to support a supply of leads, means for giving said rod a tendency to move its supply toward the ejection position, means for ejecting a lead from such supply onto the type, and a clutch adapted to engage said rod whatever its position and move it to an inactive position.

98. In a justifying mechanism, in combination, a vertical box for containing a supply of leads, a plate on the top of a rod forming the bottom of said box, means tending to feed said rod upward and thereby feed the supply of leads, an ejecting mechanism located at the upper end of said box, a weighted dog through which said rod passes, said dog normally abutting a stationary stop and thereby held inactive, a rock-shaft, a lock-arm thereon connected with said dog whereby when the shaft is rocked the dog engages the rod and locks the arm to it whatever the position of said rod.

99. In a justifying mechanism, in combination, a space-key, a movable block, means for moving the same according to the actuations of said key, a shiftable plate, a stationary rack, mechanism carried by said plate and adapted to engage said rack and thereby determine the position of the plate, and means governed by said block for so operating said mechanism carried by the plate.

In testimony whereof I hereunto affix my signature in the presence of two witnesses.

FRANCIS B. CONVERSE, Jr.

Witnesses:
ALBERT H. BATES,
E. L. THURSTON.